US012654434B2

(12) United States Patent
Schwab

(10) Patent No.: US 12,654,434 B2
(45) Date of Patent: Jun. 16, 2026

(54) METHOD OF OPERATING A FLEXOGRAPHIC PRINTING PRESS, FLEXOGRAPHIC PRINTING PRESS, SYSTEM, AND SLEEVE FOR A FLEXOGRAPHIC PRINTING FORME

(71) Applicant: Heidelberger Druckmaschinen AG, Heidelberg (DE)

(72) Inventor: Werner Schwab, Bechtsrieth (DE)

(73) Assignee: Heidelberger Druckmaschinen AG, Heidelberg (DE)

(*) Notice: Subject to any disclaimer, the term of this patent is extended or adjusted under 35 U.S.C. 154(b) by 0 days.

(21) Appl. No.: 17/507,897

(22) Filed: Oct. 22, 2021

(65) Prior Publication Data

US 2022/0126563 A1 Apr. 28, 2022

(30) Foreign Application Priority Data

Oct. 22, 2020 (DE) ......................... 102020213329.8

(51) Int. Cl.
*B41F 5/24* (2006.01)
*B41F 13/14* (2006.01)
(Continued)

(52) U.S. Cl.
CPC ................ *B41F 5/24* (2013.01); *B41F 13/14* (2013.01); *B41F 13/24* (2013.01); *B41F 33/0081* (2013.01)

(58) Field of Classification Search
CPC .. B41F 5/24; B41F 13/14; B41F 13/24; B41F 33/0081; B41F 9/023; B41F 9/18; B41F 27/1275; B41F 27/06; B41F 27/105; B41F 27/14; B41F 5/18; B41F 33/0027; B41F 33/16; B41F 33/14; B41F 13/12;
(Continued)

(56) References Cited

U.S. PATENT DOCUMENTS 4,553,478 A 11/1985 Greiner et al.
6,314,882 B1 11/2001 Peterson
(Continued)

FOREIGN PATENT DOCUMENTS

DE 3302798 A1 8/1984
DE 19805898 A1 11/1999
(Continued)

*Primary Examiner* — Stephen D Meier
*Assistant Examiner* — Leo T Hinze
(74) *Attorney, Agent, or Firm* — Laurence A. Greenberg; Werner H. Stemer; Ralph E. Locher

(57) ABSTRACT

A method operates a flexographic printing press. The flexographic printing press includes a printing cylinder carrying a sleeve with at least one flexographic printing forme or a flexographic printing cylinder and an impression cylinder. At least one parameter of the flexographic printing press is set. The sleeve is marked with an ID, the ID is detected in a flexographic printing unit of the flexographic printing press or in the flexographic printing press. Data saved in association with the ID are transmitted to the flexographic printing unit or to the flexographic printing press, and the data are used when the parameter is set. In this manner, a cost-efficient way of producing high-quality prints in an industrial flexographic printing process is obtained. In addition, the method provides further automation of the printing process.

22 Claims, 12 Drawing Sheets

(51) Int. Cl.

| | |
|---|---|
| ***B41F 13/24*** | (2006.01) |
| ***B41F 33/00*** | (2006.01) |

(58) Field of Classification Search

CPC .. B41F 23/04; B41F 33/0009; B41F 33/0036; B41P 2227/20; B41P 2227/21; B41P 2233/10; B41P 2233/11; B41P 2233/13; B41P 2200/12

See application file for complete search history.

(56) References Cited

U.S. PATENT DOCUMENTS

| | | | | |
|---|---|---|---|---|
| 7,308,854 | B2 | 12/2007 | Rossini et al. | |
| 7,748,318 | B2 | 7/2010 | Kruempelmann et al. | |
| 8,534,194 | B2 | 9/2013 | Whitelaw et al. | |
| 2002/0056392 | A1* | 5/2002 | Sameit | B41F 13/0016 101/484 |
| 2010/0018419 | A1* | 1/2010 | Whitelaw | B41F 13/38 101/248 |
| 2014/0251169 | A1* | 9/2014 | Loddenkoetter | B41F 31/30 101/483 |
| 2019/0016111 | A1* | 1/2019 | Schwab | B41F 3/12 |
| 2019/0351688 | A1* | 11/2019 | Sievers | B41M 1/04 |
| 2020/0353742 | A1 | 11/2020 | Schwab | |

FOREIGN PATENT DOCUMENTS

| | | | |
|---|---|---|---|
| DE | 102006060464 | A1 | 7/2008 |
| DE | 102014215648 | A1 | 2/2016 |
| DE | 102020111341 | A1 | 11/2020 |
| EP | 2147786 | A2 | 1/2010 |
| EP | 3251850 | A1 | 12/2017 |
| EP | 3251853 | A1 | 12/2017 |
| EP | 3431291 | A1 | 1/2019 |
| EP | 3738773 | A1 | 11/2020 |
| WO | 2008049510 | A1 | 5/2008 |
| WO | 2010146040 | A1 | 12/2010 |

* cited by examiner

METHOD OF OPERATING A FLEXOGRAPHIC PRINTING PRESS, FLEXOGRAPHIC PRINTING PRESS, SYSTEM, AND SLEEVE FOR A FLEXOGRAPHIC PRINTING FORME

CROSS-REFERENCE TO RELATED APPLICATION

This application claims the priority, under 35 U.S.C. § 119, of German Patent Application DE 10 2020 213 329.8, filed Oct. 22, 2020; the prior application is herewith incorporated by reference in its entirety.

FIELD AND BACKGROUND OF THE INVENTION

The invention relates to a method that has the features described in the preamble of the independent method claim.

The invention further relates to a flexographic printing press which is operated in accordance with a method of the invention to print on a printing substrate using flexographic printing ink and which has the features described in the preamble of the independent flexographic printing press claim.

The invention further relates to a system consisting of a flexographic printing press of the invention and a measuring device for measuring the dot density of the flexographic printing forme, the system having the features described in the preamble of the independent system claim.

The invention further relates to a sleeve for use in a method of the invention or for use in a flexographic printing press of the invention or for use in a system of the invention, the printing forme having the features described in the preamble of the independent sleeve claim.

The technical field of the invention is the field of the graphic industry, in particular the field of operating a flexographic printing press, i.e. a rotary printing press which uses flexographic printing formes to print. In particular, the technical field of the invention is the field of controlling the press and the drives and/or actuating drives thereof to increase print quality and the productivity of the press and/or to avoid or reduce disturbances.

A requirement in what is known as flexographic printing, in particular industrial, web-fed flexographic printing, is to print in a cost-efficient way at high speeds with as little waste as possible while maintaining a high quality and using different flexographic printing formes for every print job.

In this context, changing print jobs with different printing formes and different prints may cause problems: the images to be printed may include areas where a lot is printed and areas where only little is printed as well as areas where nothing or hardly anything is printed.

Before the printing operation, flexographic printing plates may be measured, for instance in a measuring station. Non-prosecuted German patent application DE 10 2020 111 341 A1 (corresponding to U.S. patent publication No. 2020/0353742) discloses a device for measuring elevations on the surface of a rotary body and provides an improvement which in particular provides a way of quickly measuring elevations of rotary bodies such as flexographic print dots on a flexographic printing plate with a great degree of accuracy. The disclosed device for measuring elevations on the surface of a rotary bodied embodied as a cylinder, roller, sleeve, or plate of a printing press, e.g. a flexographic printing plate mounted to a sleeve, has a first motor for rotating the rotary body about an axis of rotation and a measuring device and is characterized in that the measuring device contains a radiation source and at least one area scan camera for taking contact-free measurements.

Non-prosecuted German patent application DE 33 027 98 A1 (corresponding to U.S. Pat. No. 4,553,478), Non-prosecuted German patent application DE 10 2014 215 648 A1, European patent EP 3251850, Non-prosecuted German patent application DE 10 2006 060 464 A1 (corresponding to U.S. Pat. No. 8,534,194), international disclosure WO 2010 146 040 A1, and international disclosure WO 2008 049 510 A1, which are cited and described in the aforementioned document, and the "smartGPS®" system manufactured by the Bobst Company and described therein are also part of the prior art, as is the "ARun" system of the Allstein Company.

For what is known as a "flying job change" between a job and the next job, i.e. a job change intended to be completed within a few seconds, various settings may need to be changed, for instance the pressure of the cylinders relative to one another, the printing speed, and/or the positioning of register sensors. Manual inputs and/or repositioning are disadvantageous: they take a lot of time and are inaccurate/prone to errors.

Non-prosecuted German patent application DE 33 027 98 A1, which has already been mentioned above, discloses a device for presetting printing presses wherein a contrast reading device multifunctionally scans a printing plate mounted to a plate cylinder. The scanning is done in such a way that the register and ink zone presetting is adjustable directly within the printing press by means of a control signal provided by a processing unit and a memory unit. The area coverage of the plate and the position of the plate on the plate cylinder may be measured.

SUMMARY OF THE INVENTION

An object of the present invention is to provide an improvement over the prior art, in particular an improvement that provides a cost-efficient way of producing high-quality prints in an industrial flexographic printing operation.

Solution in Accordance with the Invention

In accordance with the invention, this object is attained by a method recited in the independent method claim, a flexographic printing press recited in the independent a flexographic printing press claim, a system recited in the independent system claim, and by a sleeve for a flexographic printing forme recited in the independent sleeve claim.

Advantageous and thus preferred further developments of the invention will become apparent from the dependent claims as well as from the description and drawings.

In accordance with the invention, a method of operating a flexographic printing press, the flexographic printing press contains a printing cylinder carrying a sleeve with at least one flexographic printing forme/a flexographic printing cylinder and an impression cylinder, and at least one parameter of the flexographic printing machine being set, is characterized in that the sleeve is marked with an ID, the ID is detected in a flexographic printing unit of the flexographic printing press or in the flexographic printing press, data saved in association with the ID are transmitted to the flexographic printing unit or to the flexographic printing press, and the data are used in the process of setting the parameter.

In accordance with the invention, a flexographic printing press with at least one flexographic printing unit is provided.

The flexographic printing unit contains a printing cylinder carrying a sleeve with at least one flexographic printing forme/a flexographic printing cylinder, an impression cylinder, and an anilox roller. The flexographic printing press is operated in accordance with the method described above to print on a printing substrate using flexographic printing, is characterized in that the flexographic printing press contains a device for detecting the ID of the sleeve.

In accordance with the invention, a system consisting of a flexographic printing press of the invention and a measuring device for measuring the dot density of the flexographic printing forme is characterized in that the sleeve is marked with a machine-readable ID.

A sleeve for a flexographic printing forme marked width a machine-readable ID for use in a method or in a flexographic printing press or in a system of the invention is characterized in that the machine-readable ID is read out by a machine and saved on a computer to be accessed.

Advantageous Embodiments and Effects of the Invention

The invention advantageously provides a cost-efficient way of producing high-quality prints in an industrial flexographic printing process. In addition, the method of the invention advantageously provides further automation of the printing process.

The invention is described in the context of flexographic printing presses and flexographic printing formes (relief printing). Alternatively, the invention may be used for engraved printing formes or engraved sleeves (gravure). Thus, in the context of the present invention, “gravure” or “flexographic or gravure” may be used as alternatives to “flexographic”. Instead of “sleeve with a flexographic printing forme”, the expression “sleeve with an engraved forme” or “engraved sleeve” or “laser-engraved sleeve” or “endless laser-engraved sleeve” or “endless printing forme” or “endless printing sleeve” may be used.

FURTHER DEVELOPMENTS OF THE INVENTION

The following paragraphs describe preferred further developments of the invention (in short: further developments).

A respective further development of the method of the invention may be characterized in that a) the step of setting includes controlling, in particular in a closed control loop.
b) the ID is an unambiguous identifier of the sleeve.
c) the identifier contains multiple symbols, in particular digits and/or letters and/or special characters.
d) the ID is marked as a one-dimensional code, in particular a bar code, or as a two-dimensional code, in particular a QR code, or as a RFID tag or NFC tag.
e) the ID is detected by a device for detecting the ID, in particular a sensor or a camera.
f) the ID and the data are obtained in a measuring device—which is separate from the flexographic printing press—and saved in association with the ID.
g) the data are obtained in a contactless way.
h) the data are obtained using means other than follower rolls.
i) the data are obtained using a camera.
j) the data are obtained using a digital computer.
k) the data are obtained using software and/or hardware for digital image processing.
l) AI is used to obtain the data.
m) the AI computationally goes through learning steps, factoring in an operator’s manual settings and/or corrections to at least one parameter of the flexographic printing press.
n) the sleeve is received on a carrier cylinder in the measuring device and is rotated while the data is obtained and the sleeve is subsequently received on the printing cylinder and rotated during the printing operation.
o) the data are provided by a digital computer and/or a digital memory of the prepress department.
p) the data are saved on a digital computer and/or in a digital memory outside the flexographic printing press.
q) the data are saved in a database outside the flexographic printing press.
r) the data are saved in a cloud-based memory.
s) the data are saved in a cloud-based memory for multiple flexographic printing presses.
t) the data are provided via a data network, in particular an intranet or the internet.
u) the flexographic printing press transmits data to the digital computer and/or memory.
v) the transmitted data contain the ID.
w) the transmitted data contain measured values measured by the flexographic printing press or a separate sensor.
x) the transmitted data contain a room humidity.
y) the transmitted data contain a room temperature.
z) the data contain the following:
data about the dot density of the flexographic printing forme, i.e. on a location-dependent density of printing elevations of the flexographic printing forme or data computationally derived therefrom.
aa) the data about dot density are embodied as a density vector.
bb) the data are used when a dynamic, i.e. machine speed-dependent, setting of the contact pressure between the flexographic printing cylinder and the impression cylinder and/or between the flexographic printing cylinder and an anilox roller is set.
cc) the data are used when the contact pressure is set on the drive side of the flexographic printing press and/or on the operator side of the flexographic printing press.
dd) the data are used when the ink infeed is set.
ee) the data are used when the amount of ink that is fed in is set.
ff) the data are used when a dryer of the flexographic printing press is set.
gg) the data are used when the energy consumption of the flexographic printing press is set.
hh) the data are used when a preset value of the consumption of flexographic printing ink is set
ii) the data are used when a preset value for the selection of an anilox roller is set.
jj) the data are used when a preview image of the sleeve and/or of the flexographic printing forme is set, i.e. generated and displayed. The data are used when a preview image of a print job with at least two sleeves and/or with at least two flexographic printing formes is set, i.e. generated and displayed.
kk) the data contain the following: shore values of the sleeve and/or of the flexographic printing forme.
ll) the data are used when a dynamic, i.e. machine speed-dependent, setting of the contact pressure between the flexographic printing cylinder and the impression cylinder and/or between the flexographic printing cylinder and the anilox roller is set.
mm) the data are used when what is referred to as the kissprint is set.

nn) that the data contain the following: plate type and/or plate-specific data of a flexographic printing forme embodied as a flexographic printing plate.

oo) the data are used when a dynamic, i.e. machine speed-dependent setting of the contact pressure between the flexographic printing cylinder and the impression cylinder and/or between the flexographic printing cylinder and an anilox roller is set.

pp) the data are used when a preset value for a selection of the CMYK colors and/or spot colors and/or varnishes is set.

qq) the data contain the following: gaps, gap patterns, cylinder bounce pattern and/or data computationally derived therefrom on machine speeds and/or rotary cylinder speeds which are critical in terms of vibration.

rr) the data are used when the machine speed is set.

ss) the data are used when the machine is set up.

tt) the data contain the following: at least one non-printing area of the flexographic printing forme.

uu) the data are used when the energy consumption of the flexographic printing press is set.

vv) the data are used when a preset value for the operation of a dryer is set.

ww) the data are used when a preset value for the selection of activated and deactivated emitters, in particular UV LEDs, of the dryer is set.

xx) the data contain the following: positional data, in particular x-y coordinates, of a register mark and/or of a color measurement field of the flexographic printing forme.

yy) the x direction is the circumferential direction of the sleeve and the y direction is the direction perpendicular thereto of the sleeve.

zz) the data about the register mark are used when the color register is set.

aaa) the data about the register mark are used when a presetting of the color register is set.

bbb) the data about the register mark are used when a presetting for a measuring window in space and/or time of a register sensor is set.

ccc) the data about the color measurement field are used when a presetting for a measuring window in space and/or time of a color sensor or of a spectral sensor or of a spectrophotometer is set.

ddd) the data are used when a preset value for the selection of a printing ink or a number of printing inks is set.

eee) the data are used when a preset value for the selection of a web tension of the web of printing substrate to be printed on is set.

fff) the data comprise the following: positional data, in particular x-y coordinates of the flexographic printing forme on the sleeve.

ggg) the data comprise the following: topographical data of the sleeve and/or of the flexographic printing forme.

hhh) further data are used when settings are made.

iii) the further data are specific to the print job.

jjj) the further data contain the following: printing substrate type and/or data specific to the printing substrate.

kkk) the further data contain the following: roller type/types and/or data specific to the rollers.

lll) the further data contain the following: ink type/types and/or data specific to the ink type.

mmm) the further data contain the following: type/types of varnish and/or data specific to the varnish.

nnn) the further data are specific to the printing machine.

ooo) the further data contain the following: the spatial distance between neighboring flexographic printing units.

ppp) the further data contain the following: anilox roller type/types and/or data specific to the anilox roller.

qqq) the further data contain the following: machine speeds and/or rotary cylinder speeds which are critical in terms of vibration.

rrr) to configure a register controller of the flexographic printing press, at least one image of the surface of the sleeve or of the surface of multiple sleeves with the at least one or more flexographic printing formes is recorded by a camera before the printing operation and the image is subjected to digital image processing, at least one or at least two register marks is/are localized in terms of their x-y positions, and the configuration of the register controller is automated for the detection of register marks using the x-y positional data of the register marks.

sss) to configure the register controller of the flexographic printing press, the obtained data are used to computationally deduce which register mark of the register mark configuration is printed in which printing unit and the information is used.

A respective further development of the flexographic printing press of the invention may be characterized in that a) the flexographic printing press contains a further flexographic printing unit with at least one further printing cylinder carrying a further sleeve with at least one further flexographic printing forme, a further impression cylinder, and a further anilox roller—and every flexographic printing unit includes a device for detecting the ID of the respective sleeve.

b) at least two flexographic printing units are embodied as duplex printing units with a central impression cylinder and every duplex printing unit includes at least one device for detecting the ID of the respective sleeve.

c) at least two flexographic printing units are embodied as duplex printing units with two impression cylinders and every duplex printing unit includes at least one device for detecting the ID of the respective sleeve.

d) the flexographic printing press contains a dryer for drying the printing substrate and/or the flexographic printing ink.

e) the dryer is a hot-air dryer.

f) the dryer is an IR dryer.

g) the dryer is a UV dryer.

h) the dryer is a radiation dryer using x rays, for instance.

i) the dryer contains a dryer control unit.

j) the dryer contains a device for adjusting or controlling (potentially in a closed control loop) the power of the dryer.

k) when the flexographic printing press is in operation, cardboard is printed on.

l) when the flexographic printing press is in operation, coated cardboard, e.g. cardboard coated with polyethylene is printed on.

m) when the flexographic printing press is in operation, paper, cardboard, paperboard, foil, or a composite material is printed on.

n) the sleeve carries at least two flexographic printing formes with different images to be printed.

o) the two flexographic printing formes are mounted to the sleeve so as to follow one another in the circumferential direction or so as to follow one another in the axial direction.

p) the anilox roller is marked with an ID and the ID carries information on the transfer volume as well as for example on the geometry, ruling, and/or depth of the cells and their angulation.

q) the anilox roller is marked with an ID and information associated with this ID such as transfer volume, geometry, lines per inch, line width, and/or depth of the cells and their angulation is saved in a data memory or a cloud-based memory.

A respective further development of the system of the invention may be characterized in that a) the ID is an unambiguous identifier of the sleeve.

b) the identifier contains multiple signs, in particular digits and/or letters.

c) the ID is marked as a one-dimensional code, in particular a bar code, or as a two-dimensional code, in particular a QR code, or as a RFID tag or NFC tag.

d) the measuring device transmits the dot density or data derived therefrom directly to the flexographic printing press together with the ID.

e) the measuring device transmits the dot density or data derived therefrom indirectly to the flexographic printing press together with the ID in that the dot density or the data derived therefrom is buffered and accessed by the flexographic printing press for a printing operation with the flexographic printing forme and/or the sleeve.

f) the buffering is done on a central memory or a cloud memory.

g) the system contains a plurality of anilox rollers of different screens and/or screen rulings and/or screen angles and that in a printing operation with a flexographic printing forme, the flexographic printing press is operated with an anilox roller that is computationally selected from a plurality of anilox rollers on the basis of the dot density of the flexographic printing forme or of data derived therefrom.

h) that the selected screen roller has a screen that is finer than the screen of the flexographic printing forme.

A respective further development of the flexographic printing forme of the invention or sleeve of the invention for a flexographic printing forme may be characterized in that a) the mark with the machine-readable ID is made using a marking means different from an RFID chip.

Any desired combination of the features and combinations of features disclosed in the above sections on the technical field, invention, and further developments as well as in the section below on exemplary embodiments likewise represents advantageous further developments of the invention.

Other features which are considered as characteristic for the invention are set forth in the appended claims.

Although the invention is illustrated and described herein as embodied in a method of operating a flexographic printing press, a flexographic printing press, a system, and a sleeve for a flexographic printing forme, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

In the figures, corresponding features have the same reference symbols. Repetitive reference symbols have sometimes been left out for reasons of visibility.

Figure 1:
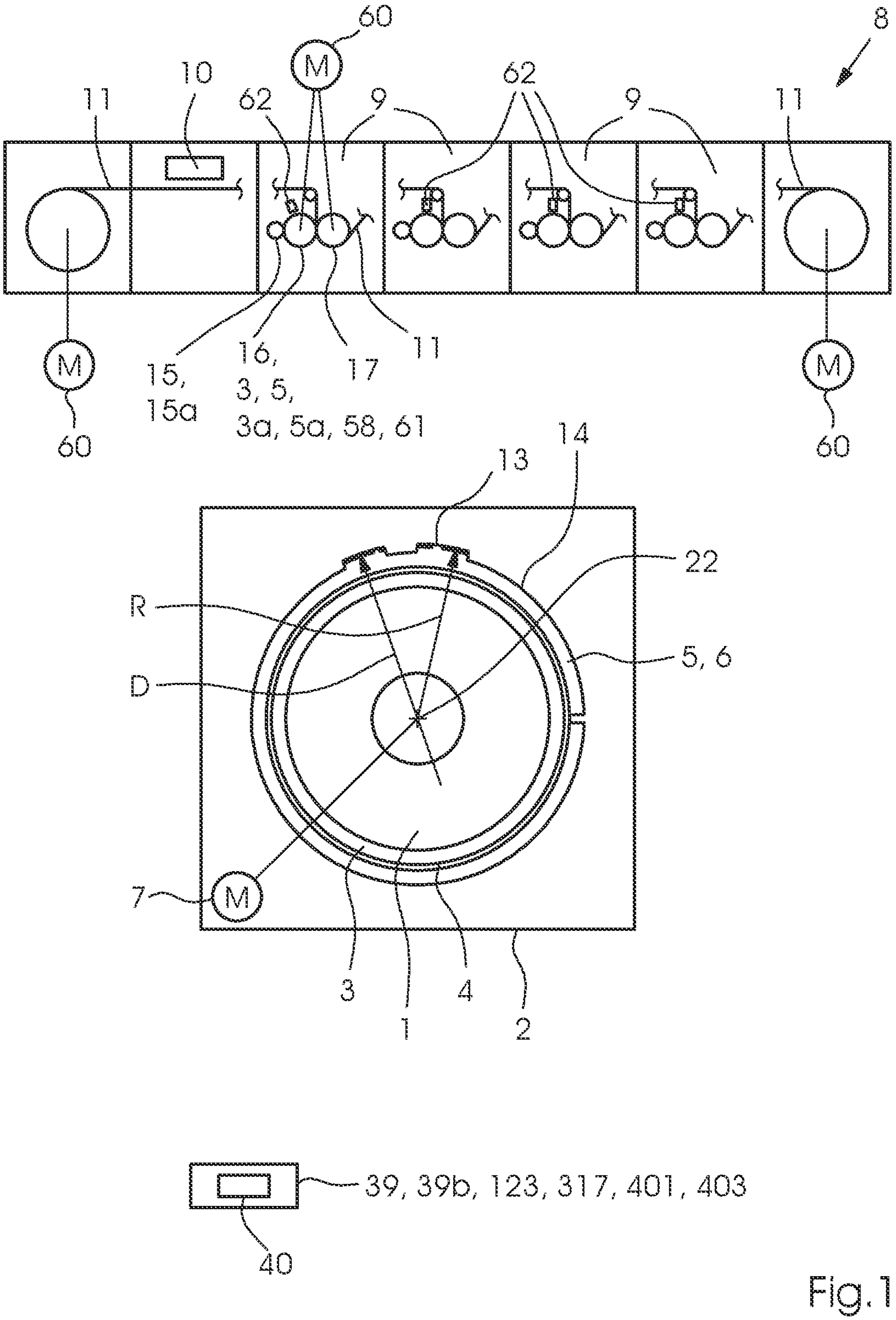
FIGS. 1 to 5 are illustrations showing a flexographic printing press, a measuring station including a measuring device (in different embodiments) and a measuring process according to the invention.

Referring now to the figures of the drawings in detail and first, particularly to FIG. 1 thereof, there is shown a cross sectional view of a rotatable carrier cylinder 1 of a measuring station 2 (alternative term: measuring device or measuring apparatus), a sleeve 3 received on the carrier cylinder, and a printing plate 5 (flexographic printing forme) as a rotary body 6. The printing plate 5 is received on the sleeve 3, preferably fixed to the sleeve by an adhesive tape 4 (or, alternatively, by means of an adhesive coating on the sleeve)—a process referred to as "mounting", and its topography is to be measured. Multiple flexographic printing plates 5 may be mounted to the sleeve adjacent to one another in an axial and/or circumferential direction.

A motor 7 may be provided in the measuring station to rotate the carrier cylinder during the measuring operation. The measuring station may be a part of what is known as a "mounter" (in which printing plates are mounted to carrier sleeves) or it may be separate from a "mounter". The measuring station may be separate from a printing press 8 (flexographic printing press) which includes at least one printing unit 9 (flexographic printing unit) for the printing plate 5 and at least one dryer 10 for printing on and drying a printing substrate 11, preferably a web-shaped printing substrate. The printing plate is preferably a flexographic printing forme with a diameter of between 106 mm and 340 mm. The dryer is preferably a hot-air dryer and/or a UV dryer and/or an electron beam dryer and/or an IR dryer. The sleeve may be pushed onto the carrier cylinder from the side. Openings for emitting compressed air to widen the sleeve and to create an air cushion when the sleeve is slid on may be provided in the circumferential surface of the carrier cylinder. The sleeve with the printing plate may be removed from the measuring device after the measuring operation to be slid onto a printing cylinder of the printing unit in the printing press. A hydraulic mounting system may be used as an alternative to the pneumatic mounting system.

In addition, FIG. 1 illustrates a digital computer and/or a digital memory 39, 39*b*, 123, 317, 401 and/or 403. The measuring device may produce data and transmit it to the computer/memory. The data may be measured values obtained by measuring the sleeve 3 and/or the flexographic printing forme(s) 5 or data derived therefrom. The computer/memory may be a part of the measuring device 2 or a part of the flexographic printing press 8; it may also be separate, for instance a central computer/memory (for instance in a print shop) or a cloud-based computer/memory. The computer/memory may transmit data to the flexographic printing press, for instance the measured values or the data derived therefrom or data further derived therefrom. The further derived data may be generated by an algorithm implemented on a computer and/or by an AI (artificial intelligence; a software or hardware-based self-learning and machine-learning system). The computer/memory may receive data from multiple measuring stations and transmit data to multiple flexographic printing presses. The system consisting of flexographic printing press(es), measuring station(s), and computer/memory provides a high degree of automation in the printing process even as far as autonomous printing; error-prone inputs and/or modifications of data made by an operator may advantageously be avoided.

The measuring station 2 may be calibrated with the aid of measuring rings 12 provided on the carrier cylinder 1. Alternatively, a measuring sleeve or the carrier cylinder itself may be used for calibration purposes.

In addition, FIG. 1 illustrates a digital computer and/or a digital memory 39, 39*b*, 123, 317, 401 and/or 403. The measuring device may produce data and transmit it to the computer/memory. The data may be measured values obtained by measuring the sleeve 3 and/or the flexographic printing forme(s) 5 or data derived therefrom. The computer/memory may be a part of the measuring device 2 or a part of the flexographic printing press 8; it may also be separate, for instance a central computer/memory (for instance in a print shop) or a cloud-based computer/memory. The computer/memory may transmit data to the flexographic printing press or receive data from the flexographic printing press, for instance the measured values or the data derived therefrom or data further derived therefrom. The data further derived therefrom may be generated by an algorithm implemented on a computer and/or by an AI (artificial intelligence; a software or hardware-based self-learning and machine-learning system). The computer/memory may receive data from multiple measuring stations and transmit data to multiple flexographic printing presses or receive data from the flexographic printing press. The system consisting of the flexographic printing press(es), the measuring station(s), and the computer/memory provides a high degree of automation in the printing process even as far as autonomous printing; error-prone inputs and/or modifications of data made by an operator may advantageously be avoided.

Figure 2A:
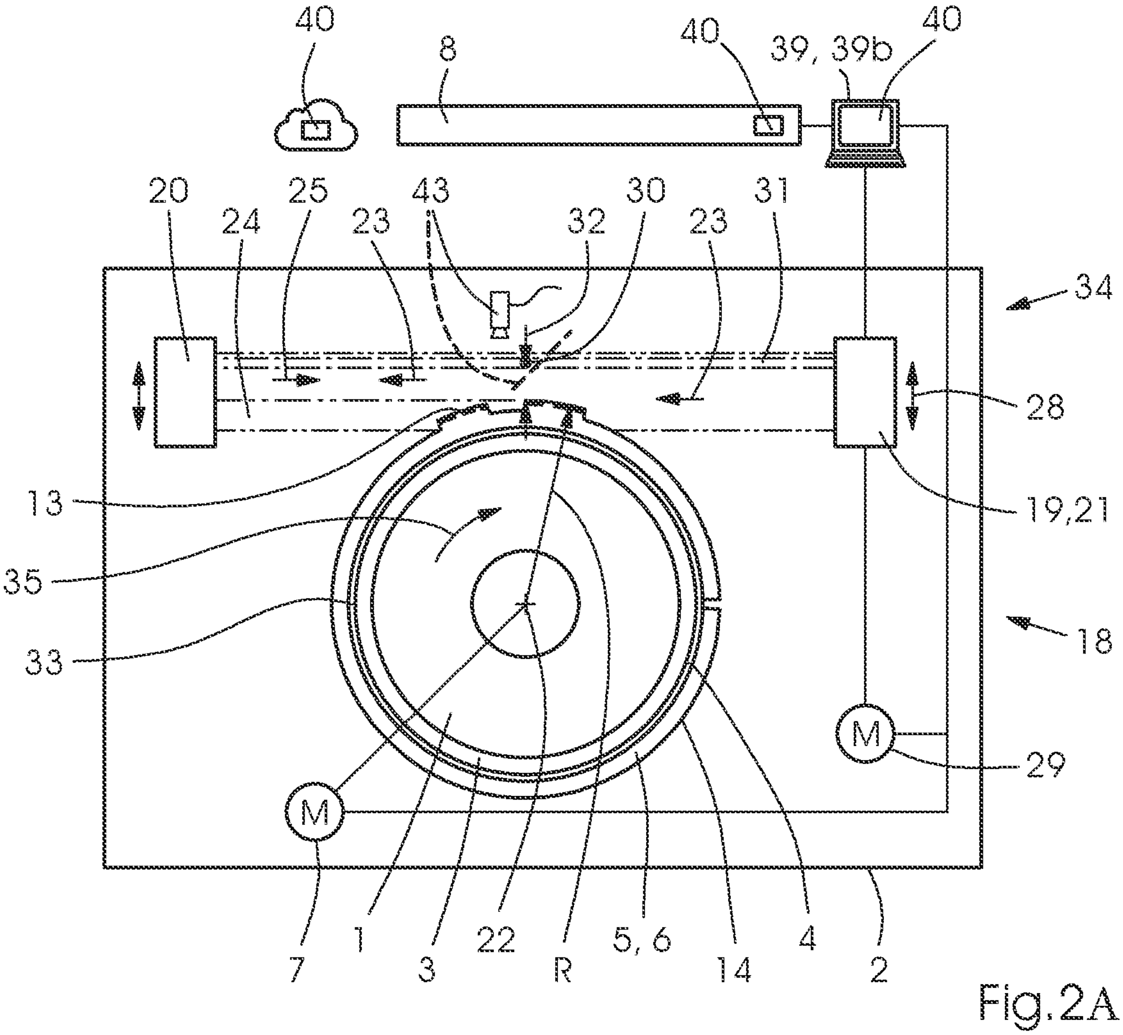
Figure 2C:
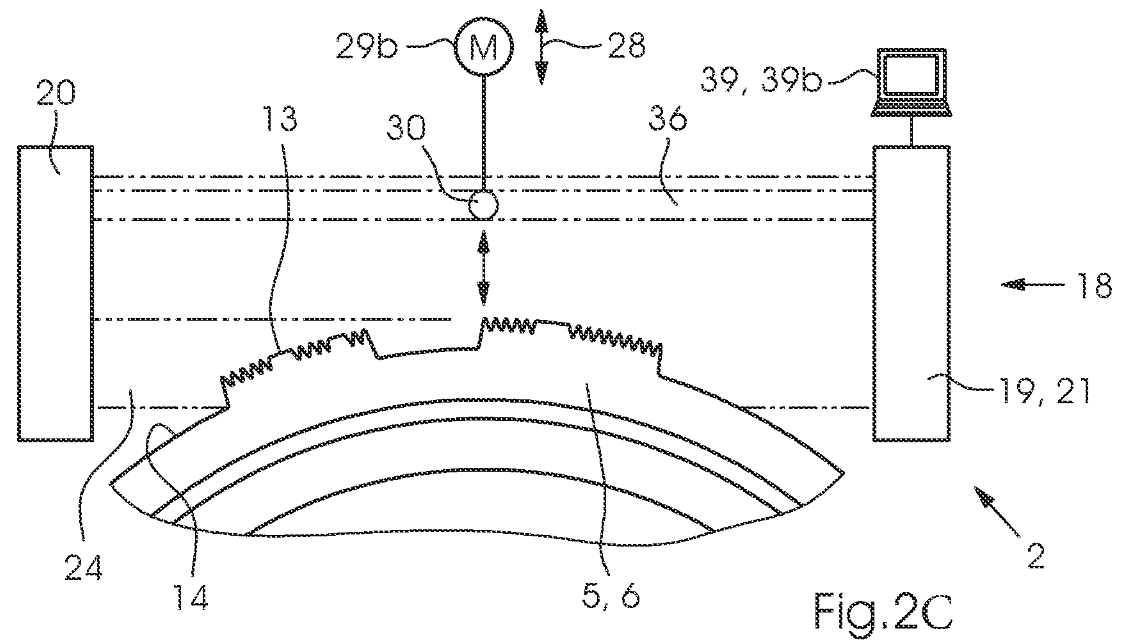

The following figures illustrate preferred embodiments of devices for taking contact-free measurements of elevations 13 on the surface 14 of a rotary body 6 embodied as a flexographic printing forme of the printing press (cf. FIG. 2C). The elevations may be flexographic printing dots (in the halftone) or flexographic printing surfaces (in a solid area) of a flexographic printing plate. The following exemplary embodiments describe the process of taking measurements on a printing plate 5. Due to the measurement of the printing plate, an automated presetting of the respective optimum operating pressure between the cylinders involved in the printing operation, e.g. an anilox cylinder 15, the printing cylinder 16 with the printing plate 5, and an impression cylinder 17, is made possible.

Figure 2B:
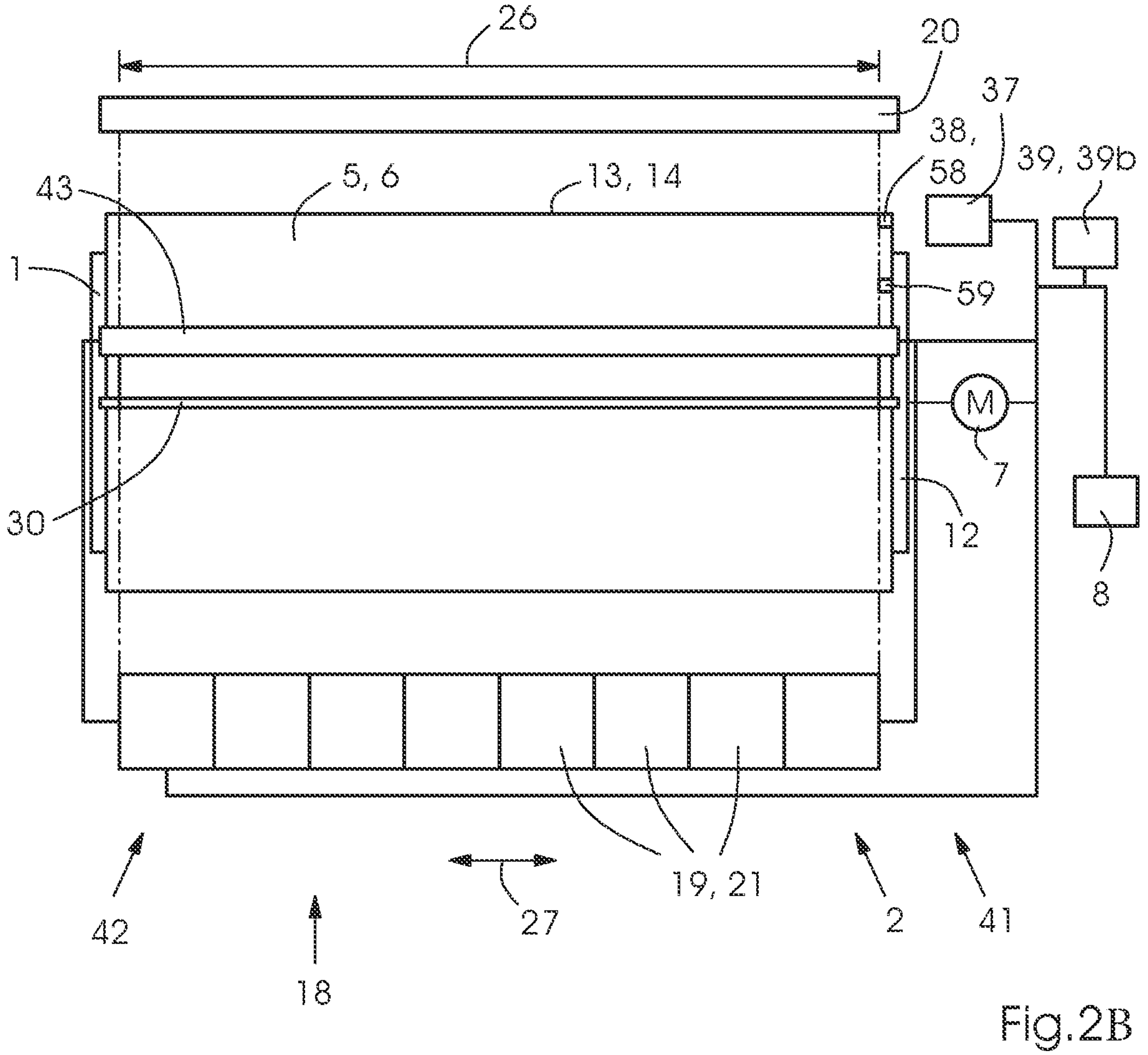

FIGS. 2A to 2C illustrate a preferred embodiment of the device for measuring the topography of a printing plate 5; FIG. 2A is a cross-sectional view, Fig. B is a top view, and FIG. 2C is an enlarged section of FIG. 2A. In accordance with this embodiment, the topography is preferably measured by multiple devices 18 in the course of a 3D radius detection with an optional reference line.

In this and the following embodiments, 2D is understood to indicate that a section of the printing plate 5 (for instance an annular height profile) is scanned and 3D is understood to indicate that the entire printing plate 5 (for instance a cylindrical height profile composed of annular height profiles) is scanned.

The device contains multiple radiation sources 19, in particular light sources 19, preferably LED light sources, at least one reflector 20 such as a mirror, and at least one optical receiver 21, preferably an area scan camera and in particular a high-speed camera. The following paragraphs assume that the radiation sources are light sources, i.e. visible light is emitted. Alternatively, the radiation source may emit different electromagnetic radiation such as infrared radiation. The light sources are preferably disposed in a row perpendicular to the axis of rotation 22 of the carrier cylinder 1 and generate a light curtain 23 while the carrier cylinder 1 with the sleeve 3 and the printing plate 5, i.e. the contour, generate a shading 24. The reflected and subsequently received light 25, i.e. essentially the emitted light 23 without the light 24 shaded off by the topography 13, carries information on the topography 13 to be measured. The reflector 20 may be a reflecting foil.

The light source 19 is two-dimensional. The light source preferably emits visible light. The light sources 19 and the optical receivers 21 preferably cover the working width 26, i.e. the extension of the printing plate 5 in the direction of its axis 22 (for instance 1650 mm). Preferably, n light sources 19 and receivers 21 may be provided, with 2>n>69, for example. When smaller cameras are used, an upper limit greater than 69 may be necessary. If the entire working width 26 is covered, the printing plate 5 may be measured during one revolution of the carrier cylinder 1. Otherwise, the light sources and optical receivers would have to be moved, for instance in a clocked way, in an axial direction 27 along the printing plate.

The preferred cameras for use in the process are cheap but fast cameras 21 such as black-and-white cameras. The cameras may record individual images or a film during the rotation of the printing plate 5.

The device made up of the light sources 19, reflector 20, and optical receiver 21 may preferably only be moved in a direction 28 perpendicular to the axis 22 of the carrier cylinder 1 to direct the generated strip of light 23 to the topography 13 to be measured. For this purpose, a motor 29 may be provided. Alternatively, the reflector may be stationary and only the light source and/or the optical receiver may be moved, for example by means of a motor.

In contrast to the representation, the measuring operation of the topography 13 is preferably occurs in a perpendicular direction (e.g. camera at the bottom and reflector at the top) and not in a horizontal direction because in this case, any potential bending of the carrier cylinder 1 and reference object 30 may be ignored. For this preferred solution, one needs to imagine FIG. 2A rotated through a 90° angle in a clockwise direction.

A line-like object 30, preferably a tautened thread 30 or a tautened piece of string 30, for instance a metal wire or a carbon fiber or a blade (or a blade-like object or an object with a cutting edge) or a bar, which creates a line 31 of reference for the plurality of optical receivers 21 is provided as an optional reference object 30. The line-like object preferably extends in a direction parallel to the axis of the carrier cylinder 1 and is preferably disposed a short distance 32, for instance 2 mm to 10 mm (20 mm at the maximum) away from the circumferential surface 33/the printing plate 5 arranged thereon. The received light 25 further includes information that may be analyzed on the reference object 30 such as its location and/or distance from the surface 14 of the printing plate 5 (the surface being preferably etched and therefore on a lower level than the elevations 13). The reference line may be used to determine the radial distance R of the topography 13/contour or the contour's elevations from the reference object 30, preferably by means of digital image processing. The distance between the reference object 30 and the axis 22 of the carrier cylinder 1 is known due to the arrangement and/or a motorized adjustment of the reference object 30 (optionally together with the light source 19 and the optical receiver 21 and the reflector 20 if provided). Thus, the radial distance of the contour elevations, i.e. the radius R of the print dots, may be determined by computation. Due to the use of the reference object 30 and the presence of shades created by it/of a reference line 31 corresponding to the shade (in the recorded image/from the received light) of every camera 21 a precise, of the cameras relative to one another is not strictly necessary. Moreover, the reference object 30 may be used to calibrate the measuring system.

For the purpose of movement/adjustment in a direction 28 the reference object 30 may be coupled to the light source 19 and/or to the motor 29. Alternatively, the reference object may have its own motor 29*b* for movement/adjustment purposes.

For an initial referencing of the device, a measurement preferably is taken on an ("empty") carrier cylinder or on a measuring sleeve arranged thereon (measuring the distance between the reference object and the surface from DS to OS).

For a further initialization of the device before the measuring operation, a first step preferably is to move the area scan camera 21 towards the carrier cylinder 1. The movement is preferably stopped as soon as the camera detects preferably the first elevation. Then the reference object 30 is preferably likewise moved in direction 28 until a predefined distance, e.g. 2 mm from the carrier cylinder 1 is reached.

The light source 19 and the optical receiver 21 may alternatively be disposed on opposite sides of the carrier cylinder 1; in such a case no reflector 20 is required.

The light source 19, the reflector 20 (if it is present in the embodiment), the optical receiver 21 and the optional reference object 30 form a unit 34, which is movable (in a direction perpendicular to the axis 22 of the carrier cylinder), in particular adjustable or slidable by a motor.

During the measuring operation, the carrier cylinder 1 and the printing plate 5 located thereon rotate to ensure that preferably all elevations 13 may be scanned in the circumferential direction 35. Based thereon, a topographic image and the radius R of individual elevations 13, e.g. flexographic printing dots, from the axis 22 or the diameter D (measured between opposite elevations) may be determined as a function of the angular position of the carrier cylinder 1.

In the enlarged view of FIG. 2C, a section of the topography 13 of the printing plate 5 as well as the shading 24 of the topography and the shading 36 of the reference object 30 are visible. The topographic elevations 13 may be in a range between 2 μm and 20 mm.

A sensor 37 for identifying the sleeve 3 and/or the printing plate 5 based on an identification feature 38 may be provided (cf. FIG. 2B). This feature may, for instance, be a bar code, a 2D code such as a QR code or a data matrix code, a RFID tag, or a NFC tag.

The signals and/or data generated by the light receivers 21 and containing information on the topography 13 of the measured surface 14 and on the reference object 30 are transmitted to a computer 39 to be processed, preferably via a wire or a wireless connection. The computer is connected to the printing press 8. The computer 39 analyzes the information.

Before the measurement, the reference object 30 may be moved into the reception range of the optical receiver 21 to calibrate the optical receiver. The optical receiver 21 detects and transmits the generated signals of the calibration to the computer 39. The calibration data are saved in the digital memory 40 of the computer 39.

This provides a way of saving a virtual reference object on the computer 39.

Subsequently the reference object 30 is removed from the range of the optical receiver 21 and the topography 39 of the surface 14 to be measured is processed together with the virtual reference object.

The result of the analysis is saved in a digital memory 40 of the computer, in a digital memory 40 of the printing press, or in a cloud-based memory. The saved results are preferably saved in association with the respective identification mark 38. When the sleeve-mounted printing plate 5 (or sleeve/flexographic printing forme) is used in the printing press 8 at a later point, the identification feature 38 of the printing plate 5/flexographic printing forme (or sleeve) may be scanned again to access the values associated with the identification mark 38, for instance for presetting purposes. For instance, the printing press may receive the data required for a print job from the cloud-based memory.

The result of the analysis may preferably include up to four values: The printing pressure adjustments on the two sides 41/DS (drive side) and 42/OS (operator side) between the printing cylinder 16, i.e. the cylinder carrying the measured printing plate 5, and the impression cylinder 17 or printing substrate transport cylinder 17, and the printing pressure adjustments between the anilox roller 15 for inking the measured printing plate 5 and the printing cylinder 16 as they are required during operation.

In addition, a device 43 for determining dot density, for instance by optical scanning, may be provided, preferably a CIS (contact image sensor) scan bar, a line scan camera, or a laser triangulation device. Alternatively, the device 43 may be a mirror which may pivot or be movable in a way for it to be usable together with the light sources 19, 21 to measure dot density. The device is preferably connected to a device for image processing and/or image analysis, which is preferably identical with the computer 39—i.e. the computer 39 programmed in a corresponding way—or which may be a further computer 39*b*.

A CIS scan bar may be disposed to be axially parallel with the cylinder. It preferably contains LED for illumination and sensors for recording images (similar to a scan bar in a commercial copying machine). The bar is preferably disposed at a distance of 1 to 2 cm from the surface or is positioned at this distance. The cylinder with the surface to be measured, e.g. the printing plate, rotates underneath the bar, which generates an image of the surface in the process to make it available for image analysis to determine dot density. The data obtained from the dot density determination process may additionally be used, for instance, computationally to select or recommend the best anilox roller from among a plurality of available anilox rollers for the printing operation with the recorded printing forme.

Figure 3A:
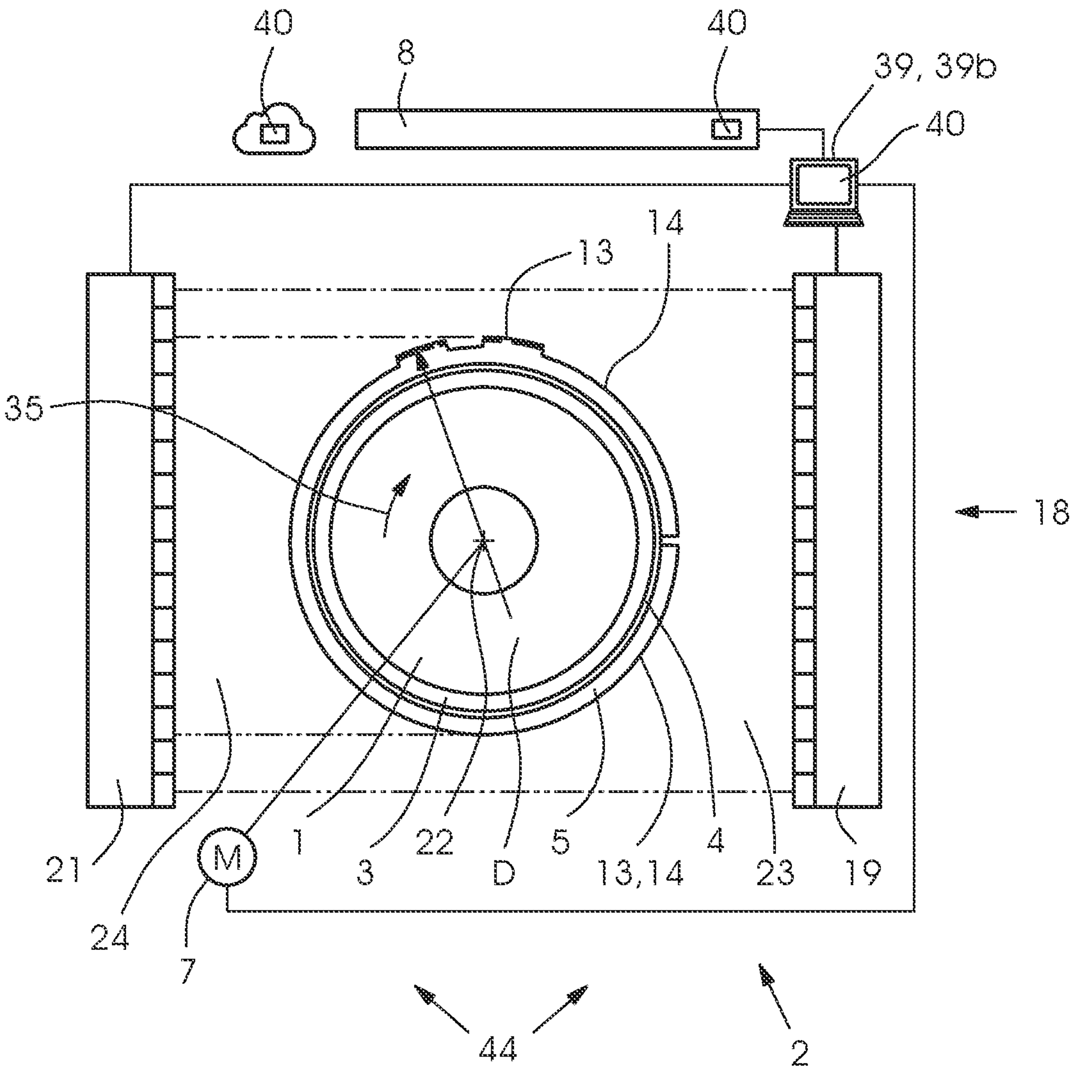
Figure 3B:
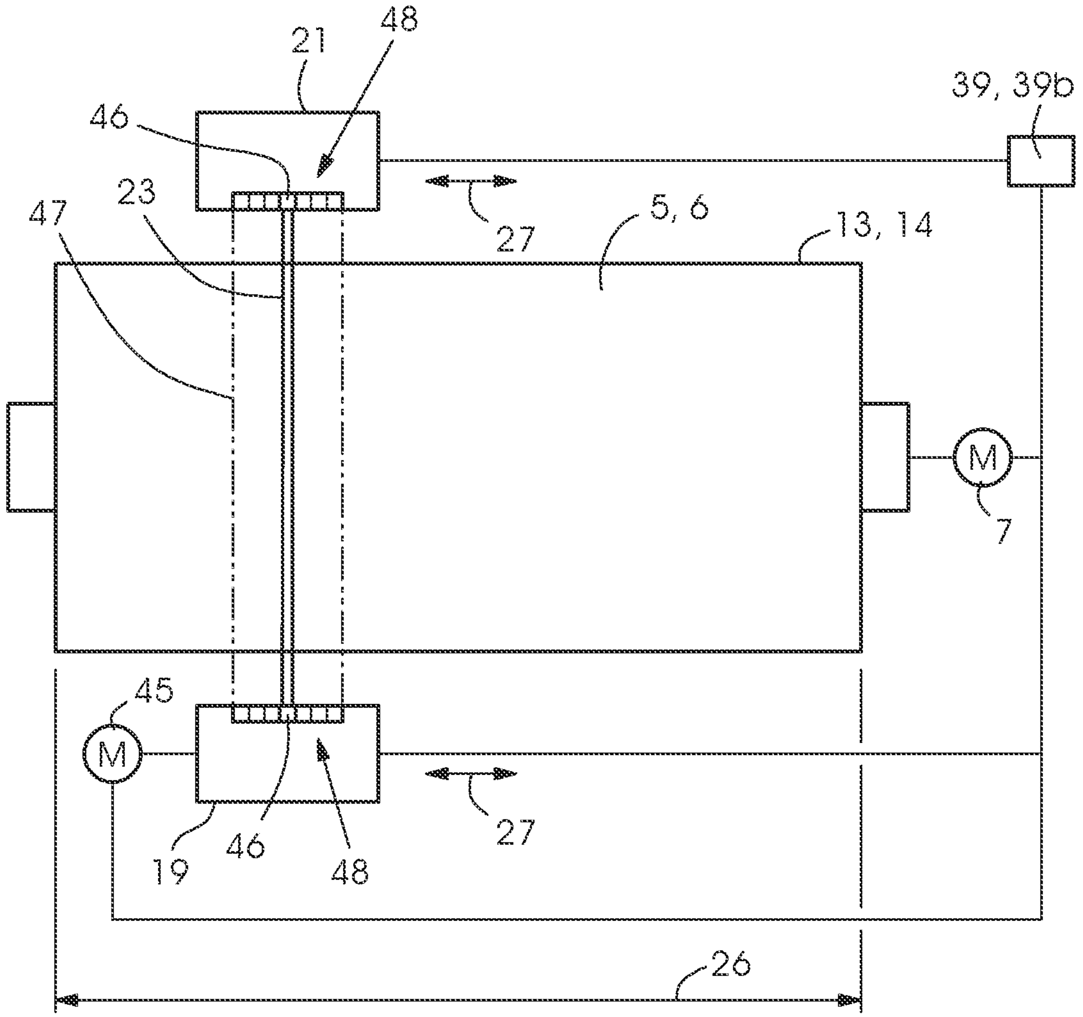

FIGS. 3A and 3B illustrate preferred embodiments of the device for measuring the topography of a printing plate 5; FIG. 3A is a cross-sectional view and FIG. 3B is a top view. In accordance with this embodiment, the topography is preferably scanned by a laser micrometer 44 in the course of a 2D diameter determination process.

The device contains a light source 19, preferably a line-shaped LED light source 19 or a line-shaped laser 19, and an optical receiver 21, preferably a line scan camera 21. Together, the laser and optical receiver form the laser micrometer 44. The light source 19 generates a light curtain 23 and the carrier cylinder 1 with the sleeve 3 and the printing plate 5 creates a shading 24. The line lengths of the light source 19 and the optical receiver 21 are preferably greater than the diameter D of the carrier cylinder including the sleeve and printing plate to allow the topography to be measured without any movement of the device 44 perpendicular to the axis 22 of the carrier cylinder. In other words, the cross section of the carrier cylinder is completely within the light curtain.

The device 44 containing the light source 19 and the optical receiver 21 may be moved in a direction parallel to the axis 22 of the carrier cylinder (in direction 27) to record the entire working width 26. For this purpose, a motor 45 may be provided.

A sensor 37 for identifying the sleeve 3 and/or the printing plate 5 based on an identification feature 38 may be provided (cf. FIG. 2B).

The signals and/or data generated by the optical receivers 21 are transmitted for further processing, preferably by wire or wireless connection, to a computer 39. The computer is connected to the printing press 8.

Light source 19 and optical receiver 21 may alternatively be disposed on the same side of the carrier cylinder 1; if this is the case, a reflector 20 is disposed on the opposite side in a way similar to the one shown FIGS. 2A and 2C.

In accordance with an alternative embodiment, the topography is preferably recorded using a laser micrometer 44 in the course of a 2D diameter determination process, which does not only record an individual measuring row 46, but a wider measuring strip 47 (illustrated in dashed lines) consisting of multiple measuring rows 48 (illustrated in dashed lines). In this exemplary embodiment, the light source 19 and the optical receiver 21 are preferably two-dimensional and not just line-shaped. The light source 19 may comprise multiple light rows 48 of a width of approximately 0.1 mm and at a distance of approximately 5 mm from one another. In this example, the camera is preferably an area scan camera.

Figure 4A:
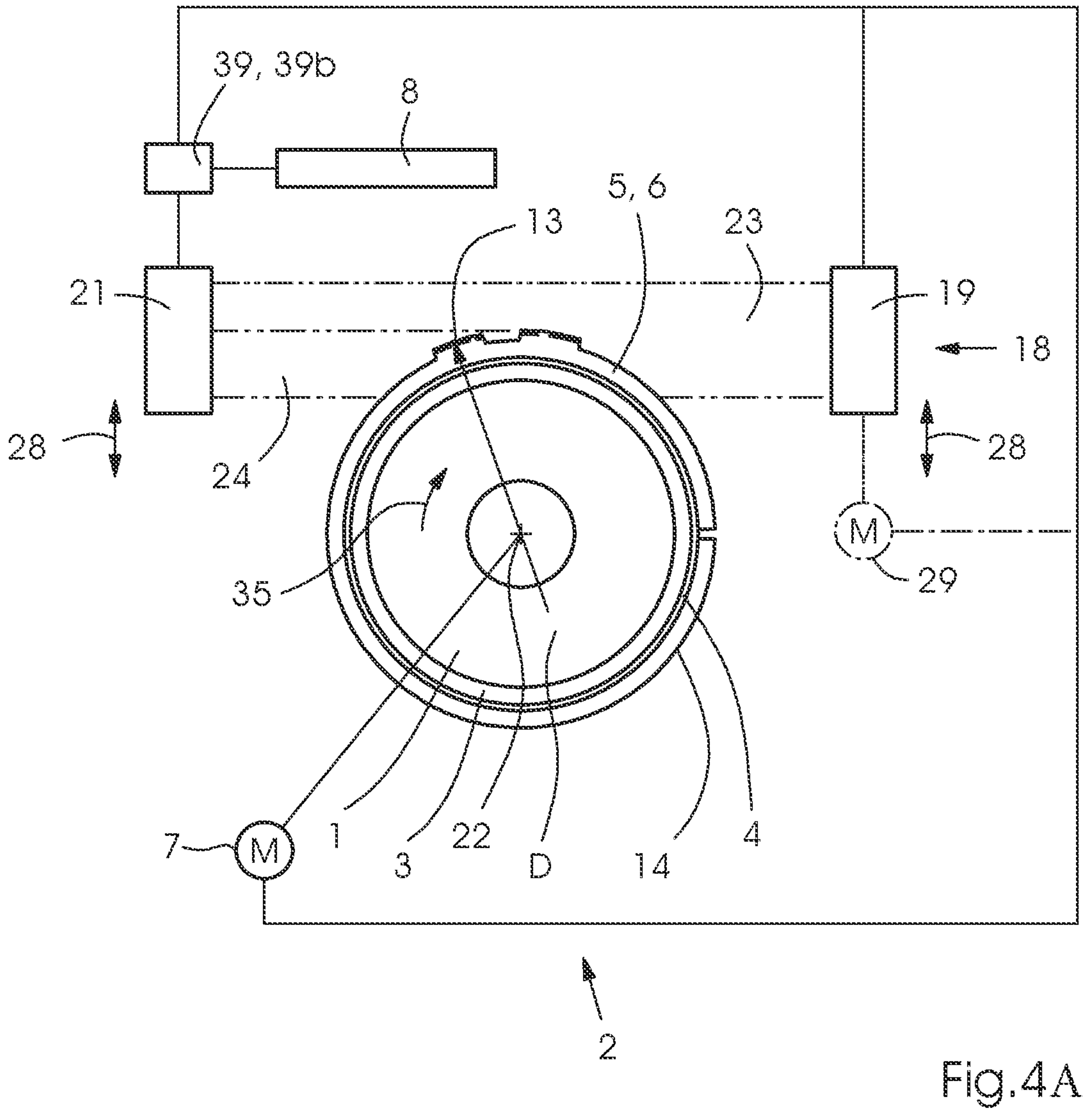
Figure 4B:
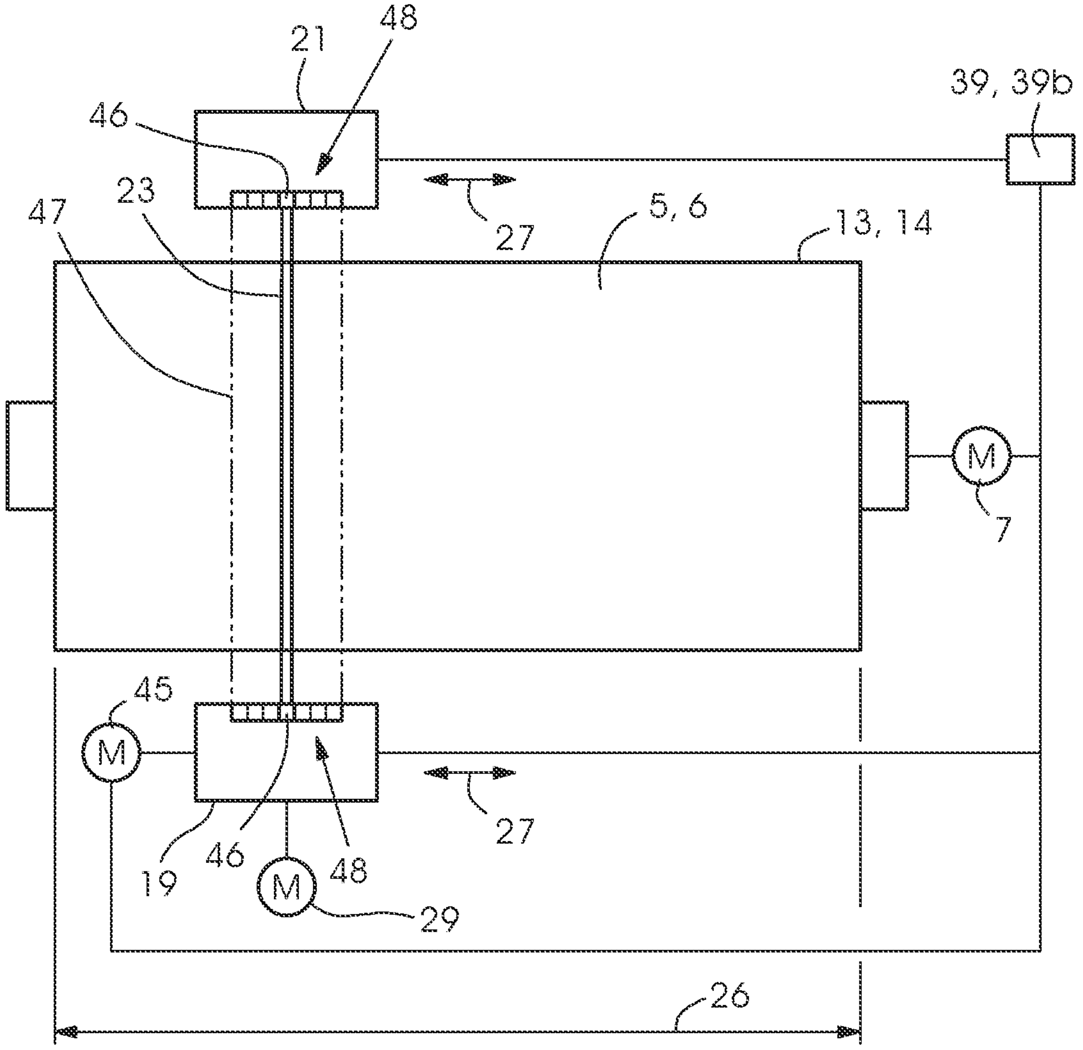

FIGS. 4A and 4B illustrate a preferred embodiment of the device for measuring the topography of a printing plate 5; FIG. 4 is a cross-sectional view and FIG. 4B is a top view. In accordance with this embodiment, the topography is preferably scanned by a laser micrometer in the course of a 2D diameter determination process.

The device contains a light source 19, preferably an LED light source 19, and a light receiver 21, preferably a line-shaped LED light source 21 or a line-shaped laser 21. The light source 19 generates a light curtain 23 and the carrier cylinder 1 with the sleeve 3 and the printing plate 5 creates a shading 24.

The device made up of the light source 19 and optical receiver 21 may preferably be moved in a direction 28 perpendicular to the axis 22 of the carrier cylinder 1 to direct the light curtain 23 to the topography 13 to be measured. For this purpose, a motor 29 may be provided. In a case in which the light curtain 23 is wide enough to cover the entire measuring area, the motor 29 is not necessary.

The signals and/or data generated by the optical receivers 21 are transmitted for further processing, preferably by wire or wireless connection, to a computer 39. The computer is connected to the printing press 8.

The light source 19 and the optical receiver 21 may alternatively be disposed on the same side of the carrier cylinder; if this is the case, a reflector 20 is disposed on the opposite side in a way similar to the one shown FIGS. 2A and 2C.

In accordance with an alternative embodiment, the topography 13 is preferably scanned using a laser micrometer 44 in the course of a 3D diameter determination process, which does not only record one measuring row 46, but a wider measuring strip 47 (illustrated in dashed lines), i.e. multiple measuring rows 48 at the same time. In this embodiment, the light source 19 and the optical receiver 21 are two-dimensional and not just line-shaped.

In accordance with a further alternative embodiment, the topography 13 is preferably scanned using a laser micrometer 44 in the course of a 3D diameter determination process, in which the device containing the light source 19 and the optical receiver 21 may preferably be moved in a direction 28 perpendicular to the axis of the carrier cylinder 1 to direct the light curtain 23 to the topography 13 to be measured. For this purpose, a motor 29 (illustrated in dashed lines) may be provided.

In accordance with an alternative embodiment, the topography 13 is preferably scanned using a laser micrometer 44 in the course of a 3D radius determination process, in which the two latter alternative embodiments are combined.

Figure 5:
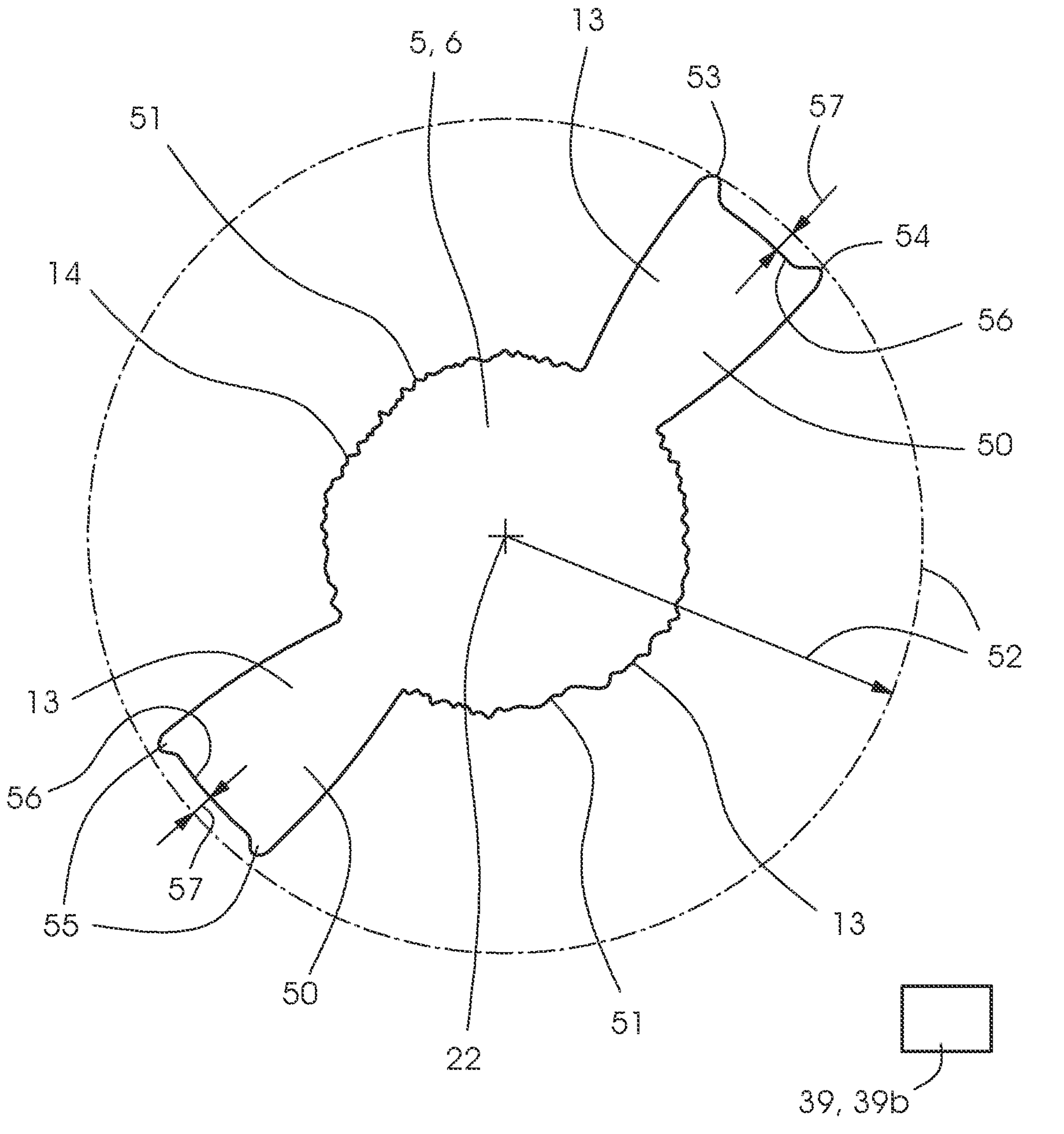

FIG. 5 is an enlarged representation of an example of a topography measurement result of a printing plate 5 (flexographic printing forme) with two printing areas 50 and two non-printing areas 51. The radial measurement results for 360° at an axial location (relative to the axis of the carrier cylinder) are shown. The non-printing areas may for instance have been created by etching and thus have a smaller radius than the printing areas.

In the drawing, an enveloping radius 52/an envelope 52 of the dots with the greatest radius on the printing plate 5, i.e. of the highest elevations of the topography 13 at the axial location is shown.

Dot 53 on the printing plate 5 is a printing dot because during a printing operation at a normal pressure/print engagement between the printing plate 5 and the printing substrate 11/transport cylinder 17 this dot would have sufficient contact with the printing substrate and the ink-transferring anilox roller. A normal pressure setting creates what is known as a kissprint, which means that the printing plate just barely touches the printing substrate and that the flexographic printing dots are not compressed to any greater extent.

Dot 54 is a dot which would only just print at a normal pressure setting during a printing operation because it would only just be in contact with the printing substrate.

The two dots 55 are dots which would not print because at regular pressure during a printing operation they would not be in contact with the printing substrate nor with the anilox roller.

A computer program which computationally identifies the radially lowest point 56 in the printing area 50 and its radial distance 57 to the envelope 52, for instance by means of digital image processing, runs on the computer 39. This computation is made at regular intervals along the axial direction, for instance from DS to OS at all measuring points to find the respective maximum of the lowest points (i.e. the absolutely lowest value) from the DS to the center and from the center to the OS. The two maximums or the adjustment values computationally obtained therefrom may for instance be selected as the respective printing pressure adjustment values/setting for DS and OS during the printing operation, i.e. the cylinder distance between the cylinders involved in the printing operation is reduced by the setting on DS and OS. A motor-driven threaded spindle may be used on DS and OS for this purpose.

The following is a tangible numerical example:

On one side, the resultant distance is deltaR=65 μm and on the other side the resultant distance is deltaR=55 μm. For all dots 53 to 55 on the printing plate to print, 65 μm need to be set.

In all of the illustrated embodiments and the alternatives that have been given, the runout resulting from the manufacturing process and/or from the use of the sleeve 3 (due to wear) may be measured and may be factored in during the printing operation on the basis of the measurement and analysis results to improve the quality of the printed products. When a predefined runout tolerance is exceeded, an alarm may be output. The measurement may be taken on smooth and porous sleeves.

In accordance with the invention, radar emitters 19 (in combination with suitably adapted receivers) may be used instead of the light sources 19 or light emitters 19 (which emit visible light).

In all of the illustrated embodiments and the alternatives that have been given, parameters for a dynamic pressure adjustment may be determined and passed on to the printing press. In this process, a delayed expansion of the deformable and/or compressible print dots 53 to 55 made of a polymeric material may be known (for instance pre-measured) and made available to the computer 39 to be factored in. Or a hardness of the printing plate which has been pre-measured using a durometer may be used. The expansion may in particular be a function of the printing speed during operation, i.e. this dependency on the printing speed may be factored in. For instance at higher printing speeds, a higher printing pressure setting may be chosen.

What may likewise be factored in (as an alternative or in addition to the printing speed) is the printing surface of the printing plate 5 or the dot density, i.e. the density of the printing dots on the printing plate 5, which may vary from location to location. For instance, at higher dot densities, a higher printing pressure setting may be chosen and/or the dot density may be used to set up dynamic printing pressure adjustment.

The received light 25, i.e. essentially the emitted light 23 minus the light 24 shaded off by the topography 13, may be used to determine the local dot density. It carries information about the topography 13 to be measured and/or about the surface dot density and/or on the elevations thereof.

A device 43 for determining/measuring dot density, i.e. the local values thereof, on the printing forme, for instance a flexographic printing forme, may be provided, preferably in the form of a CIS scan bar or a line scan camera. For instance, on the basis of the data that has been obtained/calculated in the dot density determination process, specification values for different printing pressure settings on DS (drive side of the printing press) and OS (operator side of the printing press) may be provided.

If the dot density of the printing plate 5 and/or of an anilox roller 15 for ink application and/or of an anilox sleeve 15 is known, the expected ink consumption of the printing operation using the printing plate on a given printing substrate 11 may be determined by computation. The ink consumption may then be used to compute the required drying power of the dryers 10 to dry the ink on the printing substrate. The expected ink consumption hat has been calculated may also be used to calculate the amount of ink that needs to be provided.

In all of the illustrated embodiments and the alternatives that have been given, what is referred to as cylinder bounce pattern (caused by a gap pattern) may also be factored in. A cylinder bounce pattern is a disturbance that periodically occurs as the printing plate 5 rotates. It is caused by a page-wide or at least detrimentally wide gap or channel usually extending in an axial direction in the printed image, i.e. a detrimentally large area without printing dots, or any other type of axial gap. Such gaps or the cylinder bounce pattern they cause may affect the quality of the prints because due to the kissprint setting, the cylinders involved in the printing operation rhythmically get closer and separate again as the channel region returns during rotation. In an unfavorable case, this may result in undesired density fluctuation or in even print disruptions. An existing cylinder bounce pattern may preferably be detected by means of a CIS measuring device 43 (e.g. the aforementioned pivoting or movable mirror together with the area scan cameras) or by means of an area scan camera. Then it may be computationally analyzed and compensated for when the operationally required printing pressure is set. On the basis of the detected cylinder bounce pattern, for instance, the speeds or rotary frequencies at which vibration would occur in a printing press may be calculated in advance. These speeds or rotary frequencies will then be avoided during production and passed over in the process of starting up the machine.

Every printing plate 5 may have its own cylinder bounce pattern. Gaps in the printing forme may have a negative influence on the print results or may even cause print disruptions. To reduce or even eliminate the bouncing of cylinders, the printing plate is checked for gaps in the roll-off direction. If there are known resonance frequencies of the printing unit 9, production speeds that are particularly unfavorable for a given printing forme may be calculated. These printing speeds need to be avoided as “no go speeds”.

In all of the illustrated embodiments and the alternatives that have been given, register marks (or multiple register marks such as wedges, double wedges, dots, or cross hairs) on the printing forme may be detected, for instance by means of the camera 21 or 43 and a downstream digital image processor, and their positions may be measured, saved, and made available. Thus register controllers or the register sensors thereof may automatically be adapted to register marks or axial positions. Thus errors which may otherwise be caused by manual adjustments of the sensors may advantageously be avoided. Alternatively, patterns may be detected and used to configure a register controller. It is also possible to automatically position a register sensor which is movable by a motor, in particular in an axial direction. It is also possible to compare a predefined zero point of the angular position of a printing cylinder and/or of a sleeve arranged thereon to an angular value of the actual location of a printed image (which has for example been glued on by hand), in particular in the circumferential direction (i.e. of the cylinder/sleeve). This comparison may be used to obtain an optimum starting value for the angular position of the cylinder/sleeve. In this way, register deviations may be reduced at the start of the production run. The same is true for the lateral direction (of the cylinder/sleeve).

In all of the illustrated embodiments and the alternatives that have been given, the power of the dryer 10 of the printing press 8 may likewise be controlled (potentially in a closed control loop). For instance, LED dryer segments may be switched off in areas in which no printing ink has been applied to the printing substrate, thus advantageously saving energy and prolonging the useful life of the LED.

In accordance with another advantageous feature, the power of the dryer 10 or of individual segments of the dryer may be reduced for areas on the printing plate which have a low dot density. This may save energy and/or prolong the useful life of a dryer or of individual segments. The stopping or reduction may occur in specific areas on the one hand and in a direction parallel to and/or transverse to the axial direction of a printing plate and to the lateral direction of the printing substrate to be processed by it. For instance, segments or modules of a dryer may be switched off in areas which correspond to gaps between printing plates (for instance printing plates which are spaced apart from one another, especially ones that have been glued on by hand).

In all of the illustrated embodiments and the alternatives that have been given, the respective location (on the printing plate 5) of measuring fields for print inspection systems may be detected and made available for further uses such as a location adjustment of the print inspection systems.

An inline color measuring system may be positioned in all of the illustrated embodiments and the alternatives that have been given. To determine the location and thus the position of the inline color measurement, an image and/or pattern recognition process is implemented to find the axial position for the measuring system. To provide a free space for calibration to the printing substrate, the inline color measurement system may be informed of unprinted areas.

The following section is an example of an entire process which may be carried out by a suitable embodiment of the device.

Measuring Process:

Step 1: Sleeve 3 with or without a printing plate 5 is slid onto the carrier cylinder 1 of the measuring station 2 on the air cushion and is then locked on the carrier cylinder 1.

Step 2: The sleeve is identified by a unique chain of signs 38, which may be a bar code, a 2D code (such as a QR code or a data matrix code), an RFID tag, or an NFC tag.

Step 3: Camera 21 and optionally the reference object 30 are positioned in accordance with the diameter (of the sleeve with or without the printing plate).

Step 4: The topography 13 of the printing plate, i.e. the radii of the elevations/print dots 53 to 55, is determined with the axis 6 or rather the axial center of the carrier cylinder 22 as the point of reference. In this process, the light source 19 and the camera 21 of the measuring device 18 may move in an axial direction and the carrier cylinder rotates (its angular position is known via an encoder).

Step 5: An area scan is made to detect dot densities, non-printing areas, printing areas, register marks, and/or measuring fields for inline color measurements.

Step 6: A topography algorithm running on a computer 39 is applied and the areas are analyzed via the area scan, including the detection of cylinder bounce patterns and the structure of register mark fields/inline color measurements.

Step 7: Optionally, the hardness of the plate is determined (in shore as the unit of measurement).

Step 8: A dust/hair detector is used.

Step 9: The data of the measured results are saved in a digital memory 40.

Step 10: The measured results are displayed, pointing out dust/hairs, air inclusions, and/or indicating thresholds for runout, eccentricity and/or convexity, for instance.

Step 11: The measurement may be retaken or the sleeve is removed to measure another sleeve.

Set-Up Process:

Step 1: Sleeve 3 with printing plate 5 is slid onto the printing cylinder 16 of the printing press 8 on the air cushion that has been created by applying air to the printing cylinder 16 and is then locked thereon.

Step 2: The sleeve and its unique chain of signs 38 is identified by the respecting printing unit 9, i.e. by a sensor provided therein. This may be done by bar code, 2D code (such as a QR code or data matrix), RFID tag, or NFC tag.

Step 3: The printing unit/printing press accesses the saved data associated with the identified sleeve/printing plate.

Adjustment Process:

Step 1: What is known as the kissprint setting (adjustment of the engagement/operating pressure) is set for the printing cylinder 16 and the screen cylinder 15, for instance based on the topography, runout, and printing substrate data, to achieve the optimum print setting. The diameter/radius are determined. The diameter/radius are known from the measurement.

Step 2: The pre-register is calculated on the basis of the register mark data on the printing plate or of a point of reference on the sleeve.

Step 3: The dynamic printing pressure adjustment is set on the basis of the determined dot density values, the printed area, the printing speed, and optionally of the printing substrate. Optionally, the hardness of the plate is factored in (in Shore as the unit of measurement).

Step 4: The optimum speed for the web of material is set, for instance on the basis of the calculation of the determined resonance frequencies of the printing unit for the printing plate by detecting the cylinder bounce pattern.

Step 5: The optimum drying power (UV or hot air) is set on the basis of the dot density values and the printed area as well as on the basis of anilox cylinder data (such as pick-up volume), and is optionally dynamically adapted to the speed of the web of material.

Step 6: The ink consumption is calculated on the basis of the dot density values and the printed area as well as on the basis of anilox cylinder data (such as pick-up volume).

Step 7: LED-UV dryer sections in places where the plate has a low dot density or where no drying is needed are reduced or switched off to save energy and increase the useful life of the LEDs.

Step 8: The register controller is set in a fully automated way on the basis of the obtained register mark data, for instance the mark configuration and the automated positioning of the register sensor.

Step 9: The measuring position for spectral inline measurement and print inspection of the printed inks is set, information on the location/the measuring position is provided.

Figure 6:
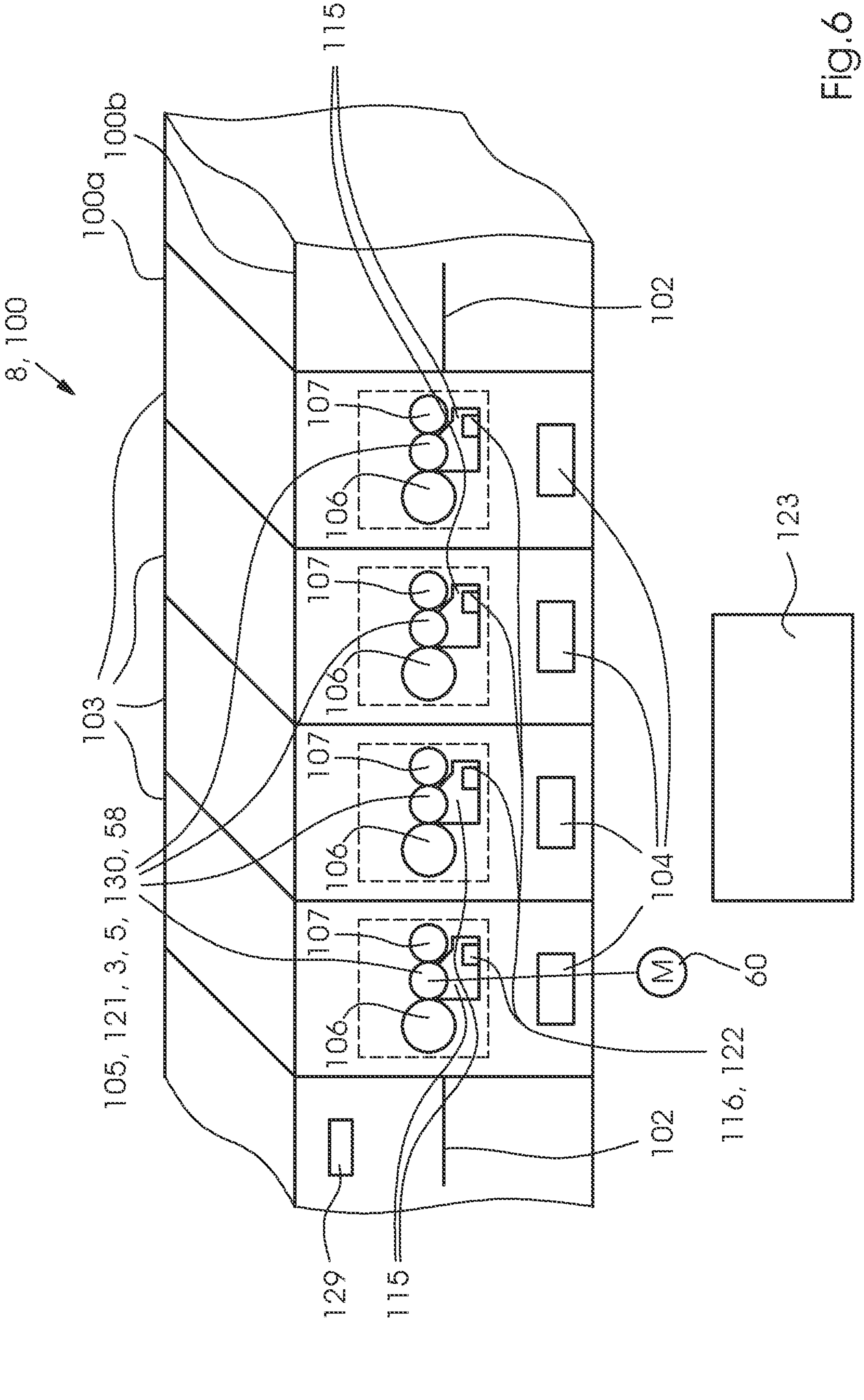
FIGS. 6 and 7 are illustrations showing a flexographic printing press and a device for controlling the contact pressure.

FIG. 6 illustrates an example of a web-fed flexographic printing press 100 implementing a method of the invention.

The machine 100 is of in-line construction and has two longitudinal sides: a drive side 100*a* and an opposite operator side 100*b*. The machine processes or rather prints on a web of printing substrate 102, preferably made of paper, cardboard, paperboard, foil, or a composite material. The web may be provided by means of a device for unwinding a web. The machine contains a number of printing units 103 preferably arranged to succeed one another. Every printing unit contains at least one motor 104 for driving the printing unit or at least one cylinder of the printing unit during the printing operation. The web may be further processed, for instance die-cut, after the printing operation.

Figure 7:
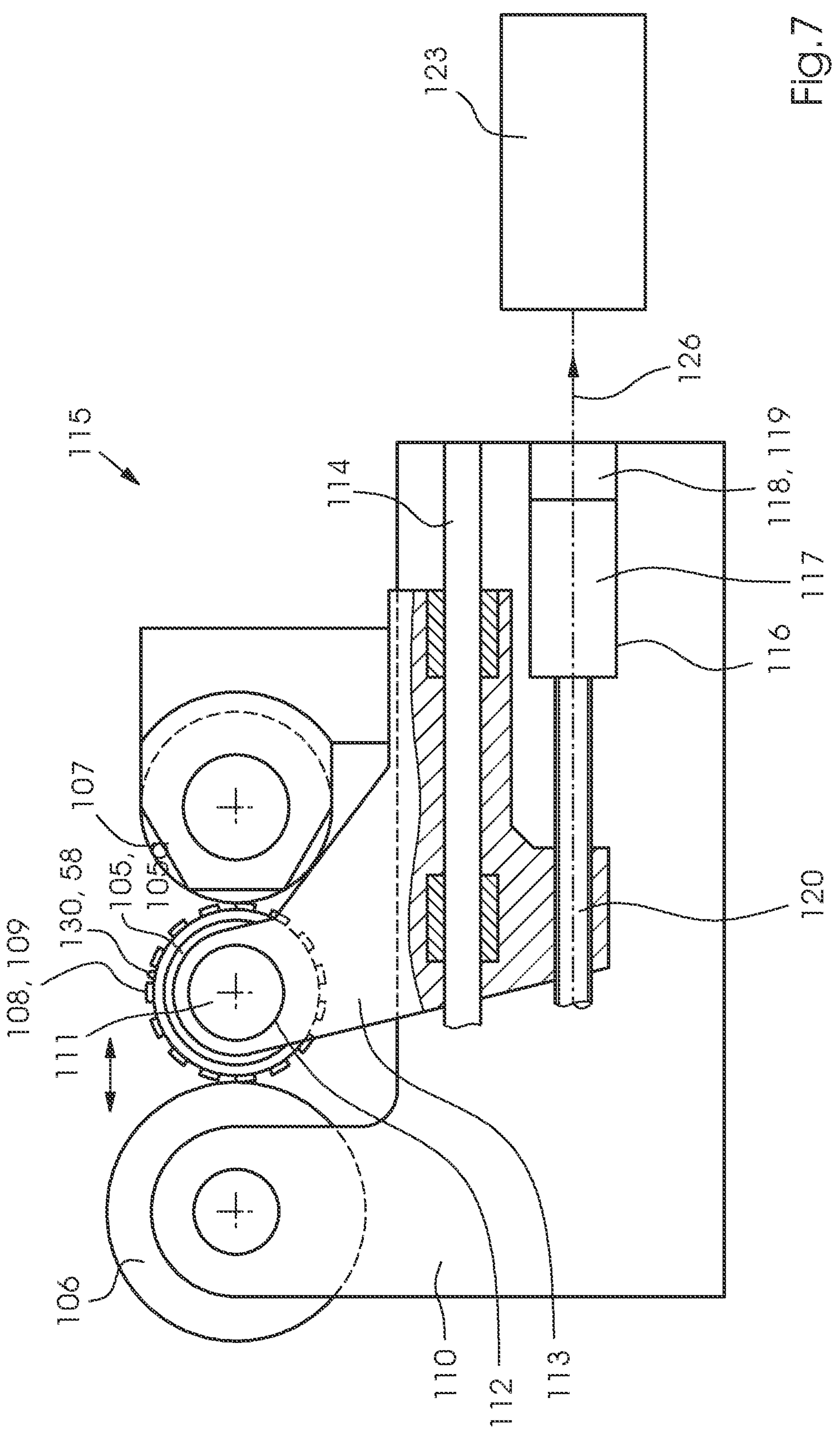

The machine 100 contains multiple printing cylinder 105, 121, in particular flexographic printing cylinders, and associated impression cylinders 106 and anilox rollers 107 (cf. FIG. 7). Every printing cylinder carries a printing forme 108, also known as a stereotype, with a print image 109 made up of printing and non-printing areas, in particular a flexographic printing forme, e.g. a flexographic printing plate, with raised printing portions.

Every printing unit 103, yet at least one or two printing units, preferably contains a control device 115 with a respective actuating drive 116 or 122.

The machine 100 further contains a digital computer 123. Connections for exchanging signals or data with the machine and the components thereof such as the motors 104 or actuating drives 116 are provided even though they are not shown for reasons of clarity.

FIG. 7 illustrates a closed-loop control device 115 as it carries out a method of the invention.

On at least one side (drive side 101*a*/DS or operator side 101*b*/BS), the impression cylinder 106 is received in a frame 110 of the machine 101; a journal 111 of the printing cylinder 105 is received in a bearing 112 of a bearing block 113. The bearing block is movable relative to the frame, preferably in a horizontal direction. A guide 114 is provided for this purpose.

A closed-loop control device 115 is provided on DS and/or OS, preferably for controlling the position of the printing cylinder 5 in a closed control loop and/or preferably for controlling the contact pressure/engagement force between the printing cylinder 105 and the impression cylinder 106 in a closed control loop. The device contains an actuating drive 116, preferably an electric motor 117, especially a servomotor 117, which contains a master 118. The master 118 may be an encoder 119 or comprise an encoder 119. A spindle 120, preferably a ball screw, is coupled to or arranged on the actuating drive 116. In co-operation with the guide 114, the spindle 120 converts the rotary movement of the actuating drive into a linear movement of the bearing block 113.

The digital computer 123 is connected to the actuating drive 116. The digital computer may control the rotary movements of the actuating drive. Thus the position and/or the contact pressure/printing pressure between the printing cylinder 105 and the impression cylinder 106 may be set, in particular controlled, for instance in a closed control loop. The adjustment is made as a function of a dot density of the flexographic printing forme, i.e. of a location-dependent density of printing elevations of the flexographic printing forme or of data computationally derived therefrom. The setting may in particular occur dynamically during the printing operation, i.e. as a function of the rotary speed of the flexographic printing cylinder 105. A further contact pressure, i.e. a contact pressure between the flexographic printing cylinder 105 and the screen roller 107, may be adjusted by means of a motor. For this purpose, the motor 117 or a (non-illustrated) further cylinder may be provided. The adjustment of the further contact pressure may be done dynamically during the printing operation, i.e. as a function of the rotary speed of the printing cylinder.

Figure 8:
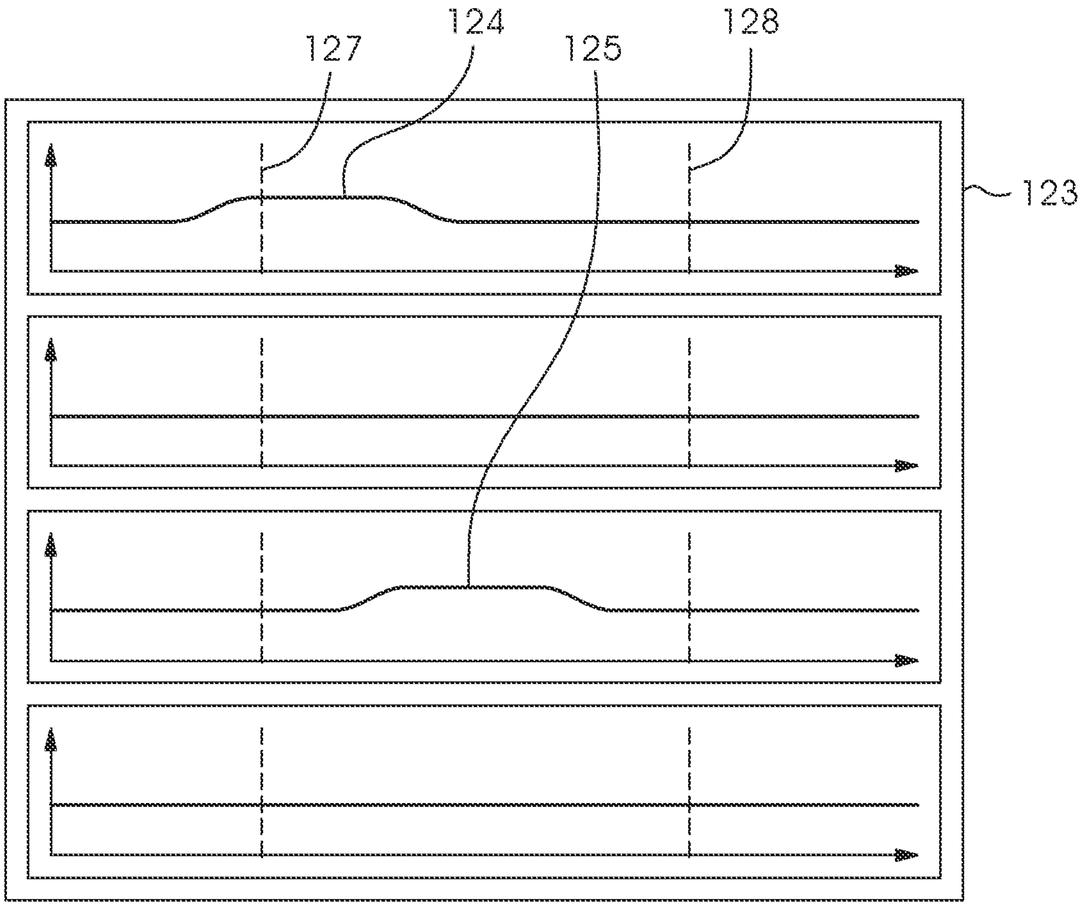
FIG. 8 illustrates graphs for understanding a method.

FIG. 8 illustrates selected steps of a preferred embodiment of the method of the invention.

The drawing schematically shows the digital computer 123, which monitors the printing units, of which an exemplary number of four is provided, computationally analyzing the disturbances and compensating for them, reducing them, or preventing them in the process. A diagram is shown for every printing unit (from top to bottom: first to fourth printing unit), plotting the amplitude of a disturbance over the printing speed.

In the illustrated example, a printing speed-dependent disturbance 124 occurs in a first printing unit and a further printing-speed dependent disturbance 125 is caused in a further printing unit, for instance in the third printing unit. The digital computer 123 detects these disturbances at the respective printing speeds. The disturbances may be detected by means of a comparison between the amplitude and a predefined threshold. For instance, when a disturbance is detected at a first printing speed 127, the printing speed may be modified until no disturbance occurs at a second speed—neither in the first printing unit nor in any other one. Then this second printing speed is the one that is subsequently used to operate the machine 1. In other words, the printing speed is increased (or reduced) until there are no disturbances in any one of the printing units.

Figure 9:
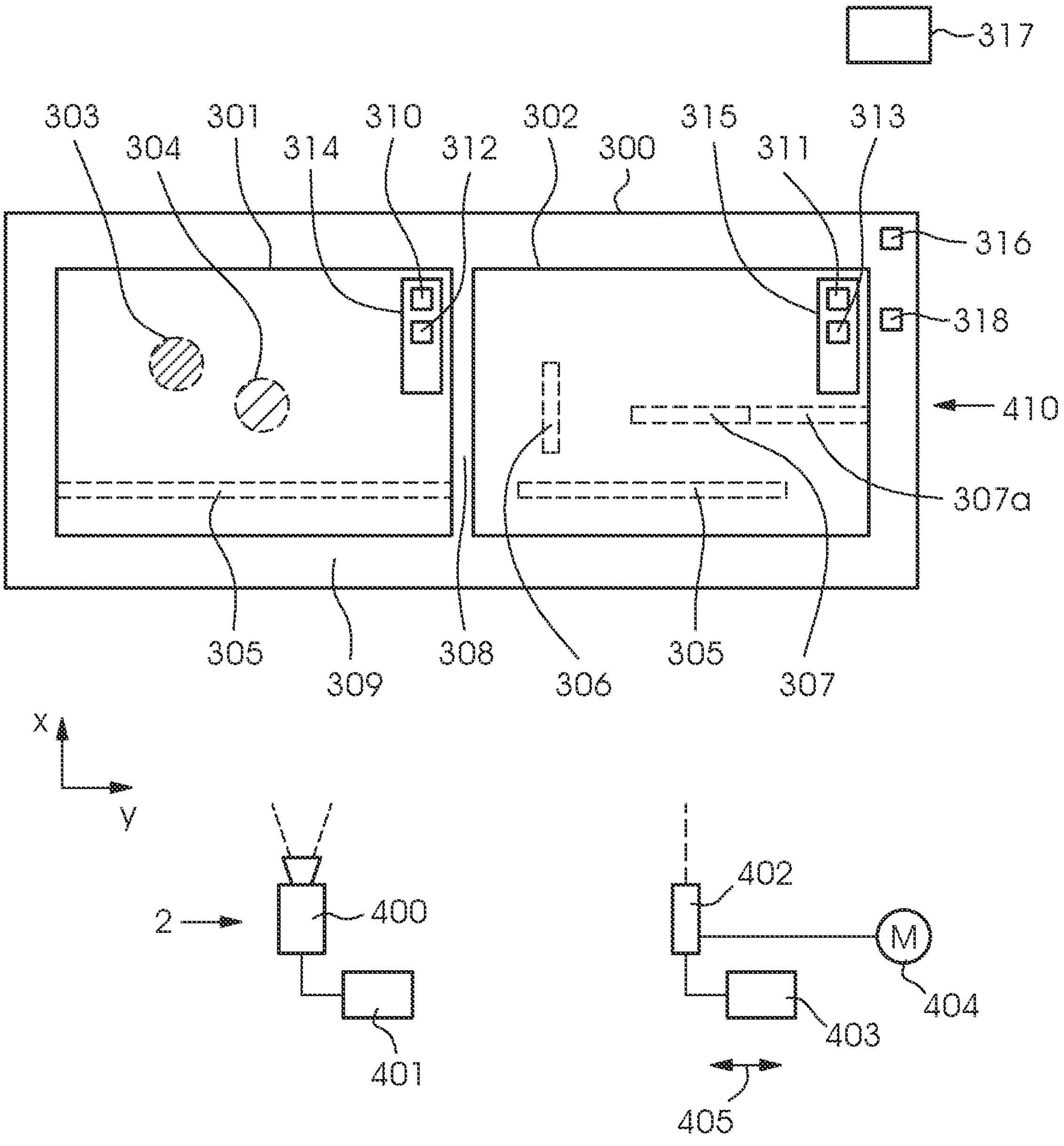
FIG. 9 is an illustration showing a recorded image on a sleeve carrying two flexographic printing formes by way of example.

FIG. 9 illustrates a recorded image 410 of a sleeve 300 and of two flexographic printing formes 301 and 302 shown as an example. The image has preferably been recorded/generated by a camera 400, in particular in a measuring station 2. The image may be transmitted to a computer 401. This computer may be the computer 39 shown in FIG. 2A. The image may be subjected to computational image processing to obtain information/data. These data may be saved in a digital memory 317 in association with an ID/an identifier 316 on the sleeve and may be made available to the flexographic printing press when the sleeve is used and the ID is called up.

FIG. 9 illustrates an example of a recorded area 303 of a high dot density and a recorded area 304 of a low dot density. The areas may be detected and separated by an image processing system and may preferably be color-coded. The knowledge of the local dot densities of the entire flexographic printing forme 301 (and of the further flexographic printing forme 302) may be used to computationally determine a presetting for what is referred to as the printing engagement, i.e. a setting of the contact pressure between the flexographic printing cylinder and the impression cylinder (and/or the anilox roller) when the sleeve is in use.

FIG. 9 also shows an example of a detected gap 305. In the region of the gap 305 there are no (or hardly any) printing elevations on the flexographic printing forme 301. The gap 305 primarily extends in an axial y direction and has an axial length in a direction y (and a width in a direction x) that makes it critical in terms of potential cylinder bouncing when the gap passes the printing nip and thus in terms of potentially detrimental vibration. Gaps 306 and 307 are two examples of gaps that are uncritical from this point of view because of their dimensions and because they are adjacent to printing areas 307*a*. The same is true for the gap 308 formed between the two flexographic printing formes 301 and 302 which are mounted at a distance from one another (e.g. glued to the sleeve 300). The gap 309 between the leading and trailing edges of the flexographic printing forme 301 however may be critical. Critical gaps are computationally detected and preferably identified as such.

The Figure also shows two examples 310 and 311 of register marks as well as color measurement fields 312 and 313. In the illustrated example the marks and fields are disposed in control strips 314, 315, respectively. The marks and fields are preferably likewise recorded by the camera 400, recognized by an image processing system, and separated. Their positional data (x-y localization) are saved in association with the ID 316 of the sleeve.

FIG. 9 further shows an example of what is referred to as an error mark 318 for detecting a faulty mounting of a flexographic printing forme or of multiple flexographic printing formes on the sleeve or on multiple sleeves. Their positional data are likewise saved in association with the ID 316 of the sleeve.

FIG. 9 further illustrates a sensor 402. The sensor 402 may be a register sensor and/or a spectrometer, which is/are disposed in the flexographic printing unit of the flexographic printing press and directed towards the web of printing substrate 11. The sensor is connected to a computer 403 and may be moved in an axial direction y 405 by means of a motor 404 and may thus be positioned in an automated way. Using the data generated from the image 410 and making them available to the printing press when the sleeve 300 is being used, the sensor may be positioned along the printing substrate 11 to the y position of a mark 310, 311 to be printed and recorded and/or the same sensor or a further sensor may be positioned in field 312, 313 for instance for color inspection by means of a spectrometer along the printing substrate 11. The data generated by the sensor are then forwarded to the computer 403, which may be the same as computer 401 and/or as computer 39.

For an automated configuration/adjustment of the control unit of the register controller, a camera 400, 21, 43 is used to subject an image of a flexographic printing forme 410 to digital image processing, for instance by means of a computer 410, localizing at least one register mark 310, 311 in terms of its x and y positions.

These localized x/y data of the register mark may be saved in a digital memory 317 in association with an ID/an identifier 316 of the sleeve and may be made available to the flexographic printing press/to the flexographic printing unit when the sleeve is used and the ID is called up.

On the basis of the register mark position data (x-y localization), the flexographic printing press/the flexographic printing unit carries out the setting of the control unit of the register controller. The setting of the register control is understood to include the configuration of the register marks of a print job, for instance.

A print job usually involves operating multiple printing units which apply inks or varnishes and each of which is equipped with one flexographic printing forme 410. The position data (x-y localization) of the print marks 310, 311 for two flexographic printing formes, for example, may be different.

For this purpose, the register control unit of the printing machine receives the position data (x-y localization) of the print mark 310, 311 for every utilized flexographic printing forme 410 with the identifier 316, which means that the configuration of the register marks of the print job may be composed of multiple flexographic printing formes 410.

An advantageous method of configuring the register controller includes the steps of recording an image 410 of the surface of the sleeve with the at least one flexographic printing forme by means of a camera 400 and subjecting the image to image processing to localize at least one register mark 310 in terms of its x/y position; and, based thereon, automating the adjustment of the register controller for recording register marks.

The following is a summary list of reference numerals and the corresponding structure used in the above description of the invention:

1 carrier cylinder
2 measuring station
3 sleeve
3*a* ID of the sleeve
4 adhesive tape
5 printing plate/flexographic printing forme
5*a* ID of the printing plate/flexographic printing forme
6 rotary body/flexographic printing forme
7 first motor
8 printing machine/flexographic printing press
9 printing unit/flexographic printing unit
10 dryer
11 printing substrate
12 measuring rings
13 elevations/topography
14 surface
15 anilox roller/anilox cylinder
15*a* ID of the anilox roller/anilox cylinder
16 printing cylinder
17 impression cylinder/printing substrate transport cylinder
18 measuring device
19 radiation sources, in particular light sources
20 reflector/mirror
21 radiation receiver, in particular optical receiver such as cameras
22 axis of rotation
23 light curtain/emitted light
24 shading
25 reflected light
26 operating width
27 axial direction
28 direction of movement
29 second motor
29*b* further second motor
30 reference object/line-like object, in particular thread/string/blade/bar
31 line of reference
32 distance
33 circumferential surface
34 unit
35 circumferential direction
36 shading
37 sensor
38 identification mark/ID
39 digital computer
39*b* further digital computer
40 digital memory
41 drive side (DS)
42 operator side (OS)
43 device for determining dot density
44 laser micrometer
45 third motor
46 measuring row
47 measuring strip
48 multiple measuring rows
50 printing area
51 non-printing area
52 enveloping radius/envelope
53 print dot on the printing plate
54 dot just barely printing on the printing plate
55 non-printing dot on the printing plate
56 lowest point
57 radial distance
58 marking means
59 measuring field for measuring shore hardness
60 motor
62 device for scanning the ID
100 rotary printing press
100*a* drive side/DS
100*b* operator side/OS
102 web of printing substrate
103 printing units
104 motors
105 printing cylinder
105*a* sleeve
106 impression cylinder
107 anilox roller
108 printing forme/stereotype
109 printed image
110 frame
111 cylinder journal
112 bearing
113 bearing bracket or post, bearing support
114 guide
115 control device
116 actuating drive
117 electric motor or servomotor
118 master

119 encoder
120 spindle
121 further printing cylinder
122 actuating drive
123 digital computer
124 disturbances
125 further disturbances
126 output signals
127 first printing speed
128 second printing speed
129 dryer
130 ID
300 sleeve
301 flexographic printing forme
302 further flexographic printing forme
303 area of high dot density
304 area of low dot density
305 gap
306 gap, non-printing area
307 gap, non-printing area
307*a* printing area
308 gap between flexographic printing formes
309 gap
310 register mark
311 register mark
312 color measuring field
313 color measuring field
314 control strip
315 control strip
316 ID
317 memory
318 error mark
400 camera
401 computer
402 sensor
403 computer
404 motor
405 direction of movement
410 image
R radial distance
D diameter
x direction (circumferential direction)
y direction (axial direction)

The invention claimed is:

1. A method of operating a flexographic printing press, the flexographic printing press having:

at least two flexographic printing units embodied as duplex printing units with a central impression cylinder; or at least two said flexographic printing units embodied as the duplex printing units with two impression cylinders;

the duplex printing units containing a flexographic printing unit per duplex printing unit, the flexographic printing unit containing a printing cylinder carrying a sleeve with at least one flexographic printing forme, an impression cylinder and an anilox roller;

the duplex printing units containing a further flexographic printing unit per said duplex printing unit, the further flexographic printing unit containing a further printing cylinder carrying a further sleeve with at least a further flexographic printing forme, the impression cylinder as the central impression cylinder or a further impression cylinder and a further anilox roller; and wherein at least one parameter of the flexographic printing press being set, which comprises the steps of:

marking the sleeve and the further sleeve with a respective machine-readable ID configured as a unique identifier for a respective sleeve being either the sleeve or the further sleeve;

determining the respective machine readable ID and respective data for the respective sleeve and/or for a respective flexographic printing forme in a measurement device, separate from the flexographic printing press, and the respective data for the respective machine readable ID being stored outside of the flexographic printing press on a digital computer and/or in a digital memory;

recording the respective machine readable ID in the flexographic printing unit and in the further flexographic printing unit;

transmitting the respective data stored for the respective machine readable ID to a respective flexographic printing unit;

using the respective data when setting the at least one parameter;

recording at least one image of a surface of the sleeve or of multiple sleeves with the at least one flexographic printing forme by means of a camera before a printing operation for a purpose of configuring a register controller of the flexographic printing press;

subjecting the at least one image to digital image processing to localize at least one or at least two register marks in terms of their x-y position; and automating a configuration of the register controller for a detection of the register marks using x-y positional data of register marks.

2. The method according to claim 1, wherein the setting of the at least one parameter includes controlling, namely in a closed control loop.

3. The method according to claim 1, wherein the respective data are obtained in a contactless way.

4. The method according to claim 1, wherein the respective data are provided by the digital computer and/or by the digital memory of a prepress department.

5. The method according to claim 1, wherein the flexographic printing press transmits the respective data to the digital computer and/or the digital memory.

6. The method according to claim 1, wherein the respective data comprises: data about a dot density of the flexographic printing forme, including on a location-dependent density of printing elevations of the flexographic printing forme or data computationally derived therefrom.

7. The method according to claim 1, wherein the respective data are used when a dynamic setting of a contact pressure between the printing cylinder and the impression cylinder and/or between the printing cylinder and the anilox roller is set.

8. The method according to claim 1, wherein the respective data are used when an ink infeed is set.

9. The method according to claim 1, wherein the respective data are used when a dryer of the flexographic printing press is set.

10. The method according to claim 1, wherein the respective data are used when a preset value for a consumption of flexographic printing ink is set.

11. The method according to claim 1, wherein the respective data are used when a preset value for a selection of the anilox roller is set.

12. The method according to claim 1, wherein the respective data comprise: plate type and/or plate-specific data of the flexographic printing forme embodied as a flexographic printing plate.

13. The method according to claim 1, wherein the respective data are used when a preset value for a selection of CMYK colors and/or spot colors is set.

14. The method according to claim 1, wherein the respective data include: gaps, gap patterns, cylinder bounce pattern and/or data computationally derived therefrom on machine speeds that are critical in terms of vibration and/or on rotary cylinder speeds that are critical in terms of vibration.

15. The method according to claim 1, wherein the respective data are used when a machine speed is set.

16. The method according to claim 1, wherein the respective data are used when a preset value for a selection of activated and deactivated emitters of a dryer is set.

17. The method according to claim 16, the method further comprises using obtained data to computationally determine which register mark of a register mark configuration is printed in which of the flexographic printing units to configure a register controller of the flexographic printing press.

18. The method according to claim 1, which further comprises obtaining further data which includes: positional data of the at least one register mark and/or of a color measurement field of the flexographic printing forme.

19. The method according to claim 18, wherein the further data about the at least one register mark are used when a color register is set.

20. The method according to claim 18, wherein the further data which are specific to a print job are used when settings are made.

21. The method according to claim 18, wherein the further data which are specific to the flexographic printing press are used when settings are made.

22. The method according to claim 1, wherein the respective machine-readable ID is configured as a one-dimensional code, a barcode, a two-dimensional code, a QR code, a RFID-chip or a NFC-chip.

* * * * *